(12) United States Patent
Ikeo et al.

(10) Patent No.: US 11,467,374 B2
(45) Date of Patent: Oct. 11, 2022

(54) FIXED FOCAL LENGTH LENS SYSTEM AND CAMERA

(71) Applicant: Panasonic Intellectual Property Management Co., Ltd., Osaka (JP)

(72) Inventors: Aya Ikeo, Osaka (JP); Tsutomu Iwashita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 402 days.

(21) Appl. No.: 16/451,149

(22) Filed: Jun. 25, 2019

(65) Prior Publication Data
US 2019/0310442 A1 Oct. 10, 2019

Related U.S. Application Data

(63) Continuation of application No. PCT/JP2017/046902, filed on Dec. 27, 2017.

(30) Foreign Application Priority Data

Jan. 20, 2017 (JP) .............................. JP2017-008505

(51) Int. Cl.
*G02B 9/62* (2006.01)
*H04N 5/225* (2006.01)
(Continued)

(52) U.S. Cl.
CPC ............... *G02B 9/62* (2013.01); *G02B 7/021* (2013.01); *G02B 13/04* (2013.01); *G02B 13/18* (2013.01);
(Continued)

(58) Field of Classification Search
CPC . G02B 9/62; G02B 9/64; G02B 13/04; G02B 13/0045; G02B 13/18; G02B 7/021; H04N 5/2254; H04N 5/23212
(Continued)

(56) References Cited

U.S. PATENT DOCUMENTS

| 4,033,675 A | 7/1977 | Terasawa et al. |
| 4,948,238 A | 8/1990 | Araki |

(Continued)

FOREIGN PATENT DOCUMENTS

| CN | 104330868 | 2/2015 |
| JP | 59-165014 | 9/1984 |

(Continued)

OTHER PUBLICATIONS

Extended European Search Report dated Dec. 19, 2019 in corresponding European Patent Application No. 17892933.7.
(Continued)

*Primary Examiner* — Travis S Fissel
(74) *Attorney, Agent, or Firm* — Wenderoth, Lind & Ponack, L.L.P.

(57) ABSTRACT

A fixed focal length lens system includes, in order from an object side to an image side, first lens element having negative power, second lens element having negative power, third lens element having positive power, fourth lens element having power, fifth lens element having power, and sixth lens element having positive power. The third lens element is a positive meniscus lens element having a convex surface on the image side. At least one of second to sixth lens elements is made of glass. The fixed focal length lens system satisfies condition (1) below:

$$0 < (L1R2 + L2R1)/(L1R2 - L2R1) < 100 \quad (1)$$

(Continued)

where L1R2 is a radius of curvature of an image-side surface of first lens element, and L2R1 is a radius of curvature of an object-side surface of second lens element.

9 Claims, 20 Drawing Sheets

(51) Int. Cl.
  *G02B 7/02* (2021.01)
  *G02B 13/04* (2006.01)
  *G02B 13/18* (2006.01)
  *H04N 5/232* (2006.01)

(52) U.S. Cl.
  CPC ....... *H04N 5/2254* (2013.01); *H04N 5/23212* (2013.01)

(58) Field of Classification Search
  USPC ........ 359/658, 713, 752, 754, 756, 761, 762
  See application file for complete search history.

(56) References Cited

U.S. PATENT DOCUMENTS

| | | | |
|---|---|---|---|
| 4,999,007 A | 3/1991 | Aoki et al. | |
| 5,136,430 A * | 8/1992 | Hamanishi | G02B 15/1461 359/713 |
| 5,841,590 A * | 11/1998 | Sato | G02B 13/20 359/764 |
| 7,957,074 B2 | 6/2011 | Asami | |
| 9,158,094 B1 * | 10/2015 | Chen | G02B 9/62 |
| 2004/0070742 A1 | 4/2004 | Suenaga | |
| 2007/0139793 A1 | 6/2007 | Kawada | |
| 2009/0296234 A1 | 12/2009 | Asami | |
| 2010/0172030 A1 * | 7/2010 | Yamano | G02B 15/144511 359/686 |
| 2011/0242682 A1 | 10/2011 | Yamamoto | |
| 2014/0029115 A1 * | 1/2014 | Liao | G02B 13/0045 359/713 |
| 2014/0204477 A1 * | 7/2014 | Asami | G02B 13/06 359/738 |
| 2015/0077861 A1 | 3/2015 | Lin et al. | |

FOREIGN PATENT DOCUMENTS

| | | |
|---|---|---|
| JP | 1-210914 | 8/1989 |
| JP | 2-220015 | 9/1990 |
| JP | 8-160296 | 6/1996 |
| JP | 2002-055277 | 2/2002 |
| JP | 2004-245982 | 9/2004 |
| JP | 2006-309076 | 11/2006 |
| JP | 2007-164079 | 6/2007 |
| JP | 2009-288300 | 12/2009 |
| JP | 2009-300797 | 12/2009 |
| JP | 2010-009028 | 1/2010 |
| JP | 2011-221055 | 11/2011 |
| JP | 5330091 | 10/2013 |
| JP | 2014-134563 | 7/2014 |
| JP | 2015-190999 | 11/2015 |
| JP | 2016-031531 | 3/2016 |
| JP | 2016-057562 | 4/2016 |

OTHER PUBLICATIONS

Communication pursuant to Article 94(3) EPC dated Jul. 9, 2021 in corresponding European Patent Application No. 17 892 933.7.
International Search Report of PCT application No. PCT/JP2017/046902 dated Apr. 3, 2018.
English Translation of Office Action dated Nov. 25, 2020 in corresponding Chinese Patent Application No. 201780083641.X.

* cited by examiner

FIXED FOCAL LENGTH LENS SYSTEM AND CAMERA

TECHNICAL FIELD

The present disclosure relates to a fixed focal length lens system and a camera.

BACKGROUND ART

PTL 1 discloses a wide-angle small imaging lens that includes, in order from an object side to an image side, a first lens having negative power, a second lens having negative power, a third lens having power, a fourth lens having positive power, a fifth lens having positive power, and a sixth lens having negative power.

CITATION LIST

Patent Literature

PTL 1: Unexamined Japanese Patent Publication No. 2009-288300

SUMMARY OF THE INVENTION

The present disclosure provides a fixed focal length lens system having satisfactory aberrations, and a camera.

A fixed focal length lens system according to the present disclosure includes, in order from an object side to an image side, a first lens element having negative power, a second lens element having negative power, a third lens element having positive power, a fourth lens element having power, a fifth lens element having power, and a sixth lens element having positive power. The third lens element is a positive meniscus lens element having a convex surface on the image side. At least one of the second to the sixth lens elements is made of glass. The fixed focal length lens system satisfies condition (1) below:

$$0 < (L1R2 + L2R1)/(L1R2 - L2R1) < 100 \quad (1)$$

where L1R2 is a radius of curvature of an image-side surface of the first lens element, and L2R1 is a radius of curvature of an object-side surface of the second lens element.

A camera according to the present disclosure includes a fixed focal length lens system and an imaging device to image light converged by the fixed focal length lens system. The fixed focal length lens system includes, in order from an object side to an image side, a first lens element having negative power, a second lens element having negative power, a third lens element having positive power, a fourth lens element having power, a fifth lens element having power, and a sixth lens element having positive power. The third lens element is a positive meniscus lens element having a convex surface on the image side. At least one of the second to the sixth lens elements is made of glass. The fixed focal length lens system satisfies condition (1) below:

$$0 < (L1R2 + L2R1)/(L1R2 - L2R1) < 100 \quad (1)$$

where L1R2 is a radius of curvature of an image-side surface of the first lens element, and L2R1 is a radius of curvature of an object-side surface of the second lens element.

The present disclosure provides a fixed focal length lens system having satisfactory aberrations.

DESCRIPTION OF EMBODIMENTS

Exemplary embodiments will now be described in detail with reference to the drawings as appropriate. However, unnecessarily detailed descriptions may be omitted. For example, a detailed description of a well-known matter and a duplicated description of substantially the same configuration will be omitted in some cases. This is to avoid unnecessarily redundancy in the following description, and to facilitate understanding by those skilled in the art.

The inventors provide the accompanying drawings and the following description to help those skilled in the art sufficiently understand the present disclosure, and therefore have no intention to put any limitation by those drawings and description on subject matters described in claims.

First to Ninth Exemplary Embodiments: Fixed Focal Length Lens System

FIGS. 1, 3, 5, 7, 9, 11, 13, 15, and 17 are lens arrangement diagrams showing fixed focal length lens systems according to first to ninth exemplary embodiments, respectively. In each drawing, an asterisk "*" attached to a certain surface shows that the surface is aspherical. Further, the straight line drawn on the rightmost side of each drawing represents a position of image plane S, and parallel plate CG is provided on an object side of image plane S. Note that an aspect ratio of each drawing is 1.

Two lenses adjacent to and separate from each other are a lens on an object side and a lens on an image side that face each other, and a distance of air put between an image-side surface of the object-side lens and an object-side surface of the image-side lens is hereinafter referred to as an air lens.

First Exemplary Embodiment

Figure 1:
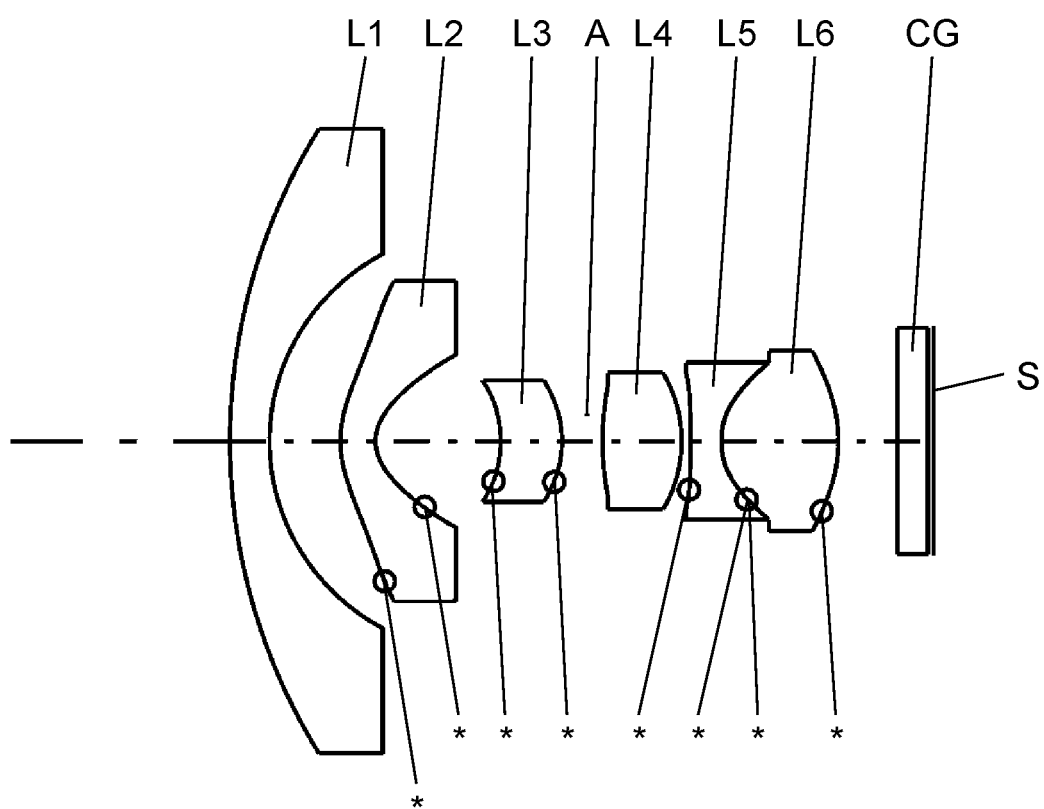
FIG. 1 is a lens arrangement diagram showing a fixed focal length lens system according to a first exemplary embodiment (a first numerical example) in an infinity focusing state.
Figure 2:
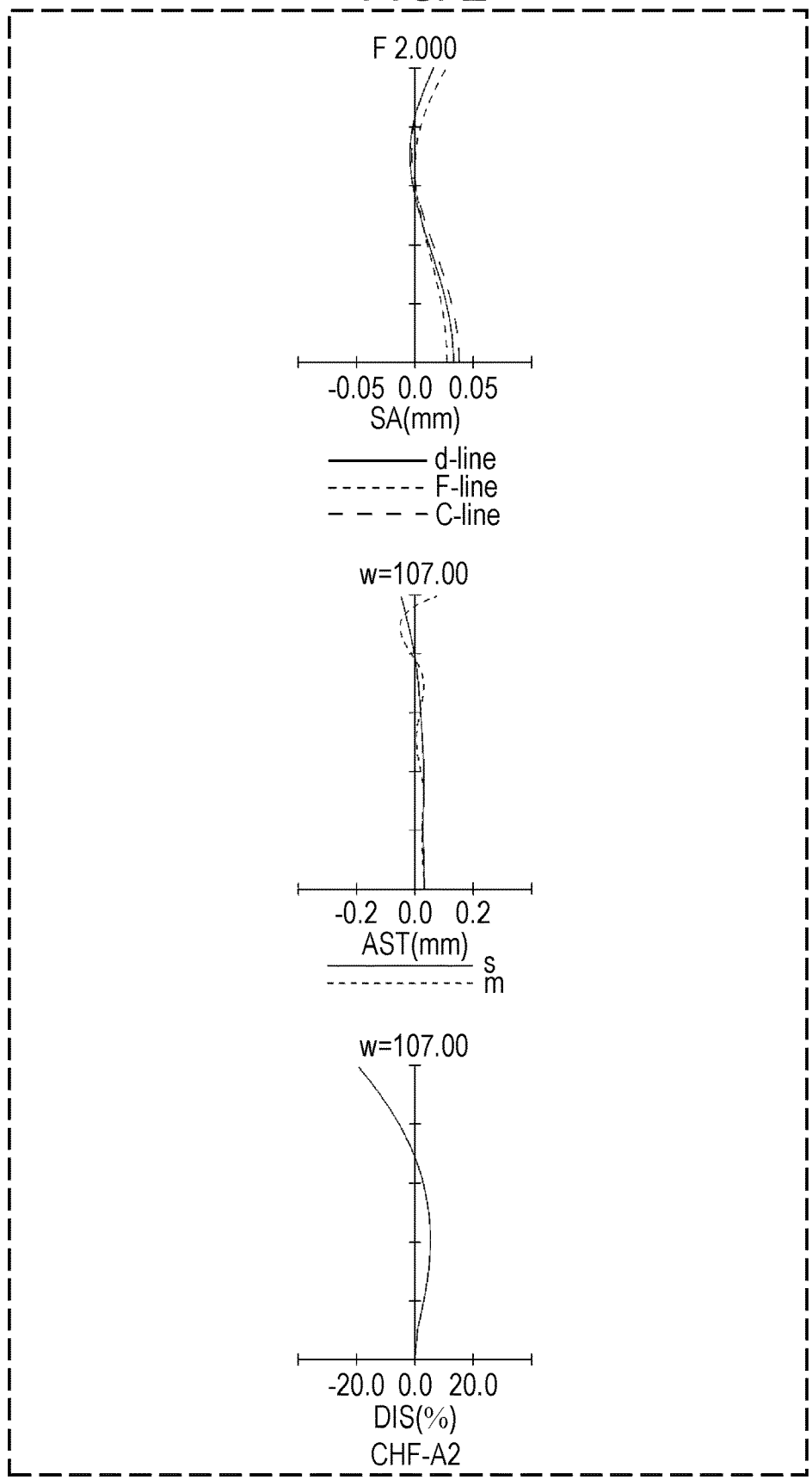
FIG. 2 is a longitudinal aberration diagram of the fixed focal length lens system according to the first numerical example in the infinity focusing state.

FIG. 1 shows a fixed focal length lens system according to a first exemplary embodiment.

The fixed focal length lens system according to the first exemplary embodiment includes, in order from an object side to an image side, first lens element L1 having negative power, second lens element L2 having negative power, third lens element L3 having positive power, aperture diaphragm A, fourth lens element L4 having positive power, fifth lens element L5 having negative power, sixth lens element L6 having positive power, and parallel plate CG.

Each of the lens elements will be described.

First lens element L1 is a meniscus lens having a convex surface on the object side.

Second lens element L2 is a meniscus lens having a convex surface on the object side. Second lens element L2 has an aspherical shape on each of the convex surface on the object side and a concave surface on the image side.

Third lens element L3 is a meniscus lens having a convex surface on the image side. Third lens element L3 has an aspherical shape on each of a concave surface on the object side and the convex surface on the image side.

Fourth lens element L4 is a biconvex lens made of glass.

Fifth lens element L5 is a biconcave lens. Fifth lens element L5 has an aspherical shape on each of concave surfaces on the object side and the image side.

Sixth lens element L6 is a biconvex lens. Sixth lens element L6 has an aspherical shape on each of convex surfaces on the object side and the image side.

Fifth lens element L5 and sixth lens element L6 are cemented to each other with an agent such as an adhesive to make up a cemented lens.

Second Exemplary Embodiment

Figure 3:
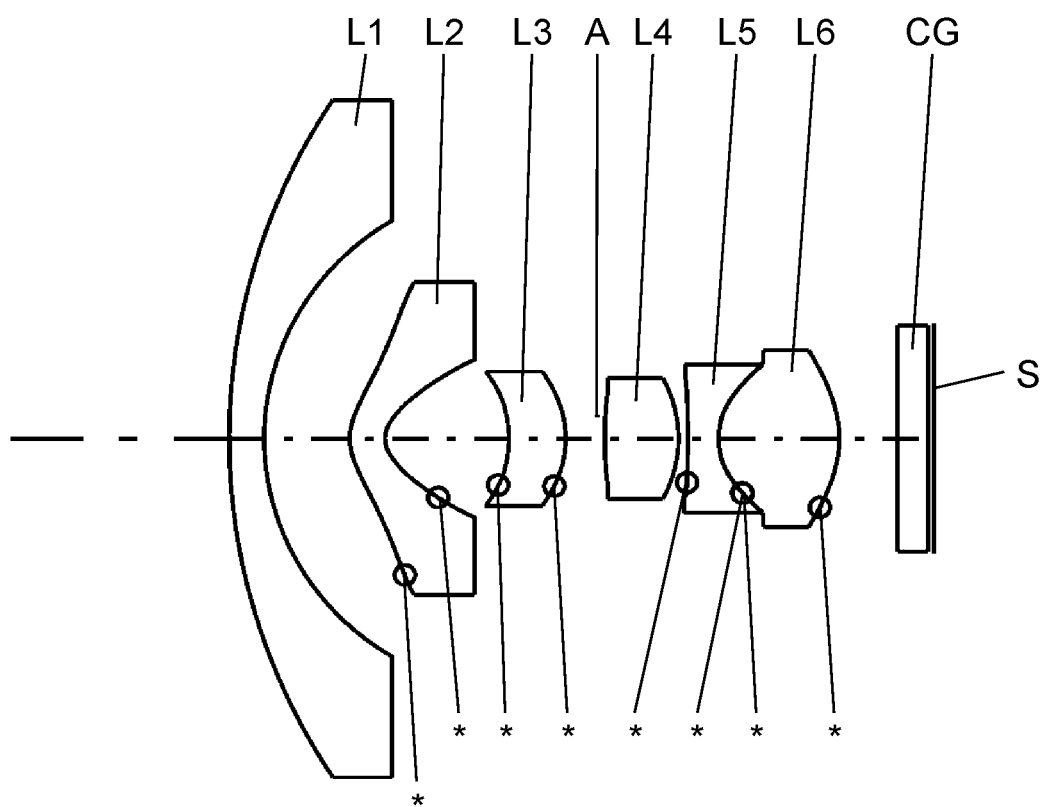
FIG. 3 is a lens arrangement diagram showing a fixed focal length lens system according to a second exemplary embodiment (a second numerical example) in an infinity focusing state.
Figure 4:
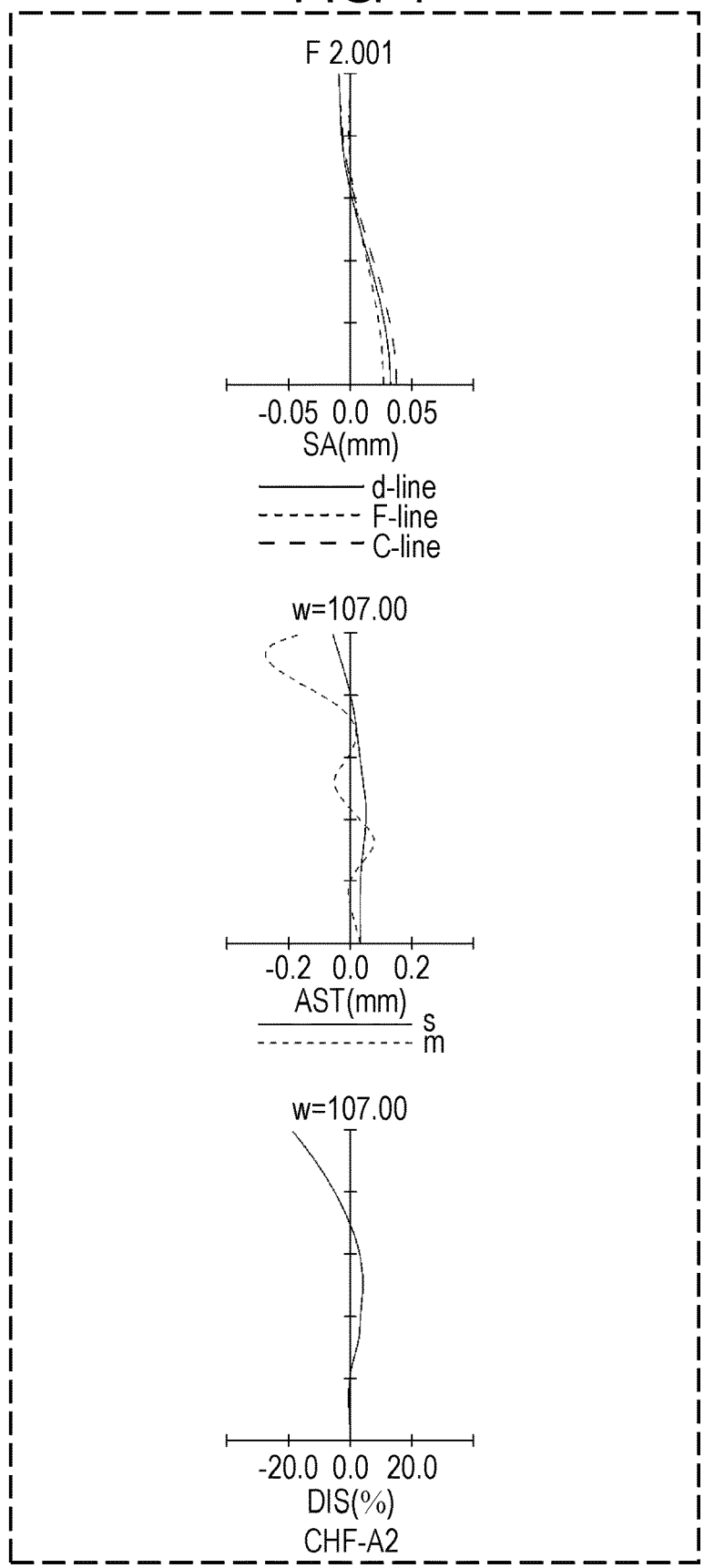
FIG. 4 is a longitudinal aberration diagram of the fixed focal length lens system according to the second numerical example in the infinity focusing state.

FIG. 3 shows a fixed focal length lens system according to a second exemplary embodiment.

The fixed focal length lens system according to the second exemplary embodiment includes, in order from an object side to an image side, first lens element L1 having negative power, second lens element L2 having negative power, third lens element L3 having positive power, aperture diaphragm A, fourth lens element L4 having positive power, fifth lens element L5 having negative power, sixth lens element L6 having positive power, and parallel plate CG.

Each of the lens elements will be described.

First lens element L1 is a meniscus lens having a convex surface on the object side.

Second lens element L2 is a meniscus lens having a convex surface on the object side. Second lens element L2 has an aspherical shape on each of the convex surface on the object side and a concave surface on the image side.

Third lens element L3 is a meniscus lens having a convex surface on the image side. Third lens element L3 has an aspherical shape on each of a concave surface on the object side and the convex surface on the image side.

Fourth lens element L4 is a biconvex lens made of glass.

Fifth lens element L5 is a biconcave lens. Fifth lens element L5 has an aspherical shape on each of concave surfaces on the object side and the image side.

Sixth lens element L6 is a biconvex lens. Sixth lens element L6 has an aspherical shape on each of convex surfaces on the object side and the image side.

Fifth lens element L5 and sixth lens element L6 are cemented to each other with an agent such as an adhesive to make up a cemented lens.

Third Exemplary Embodiment

Figure 5:
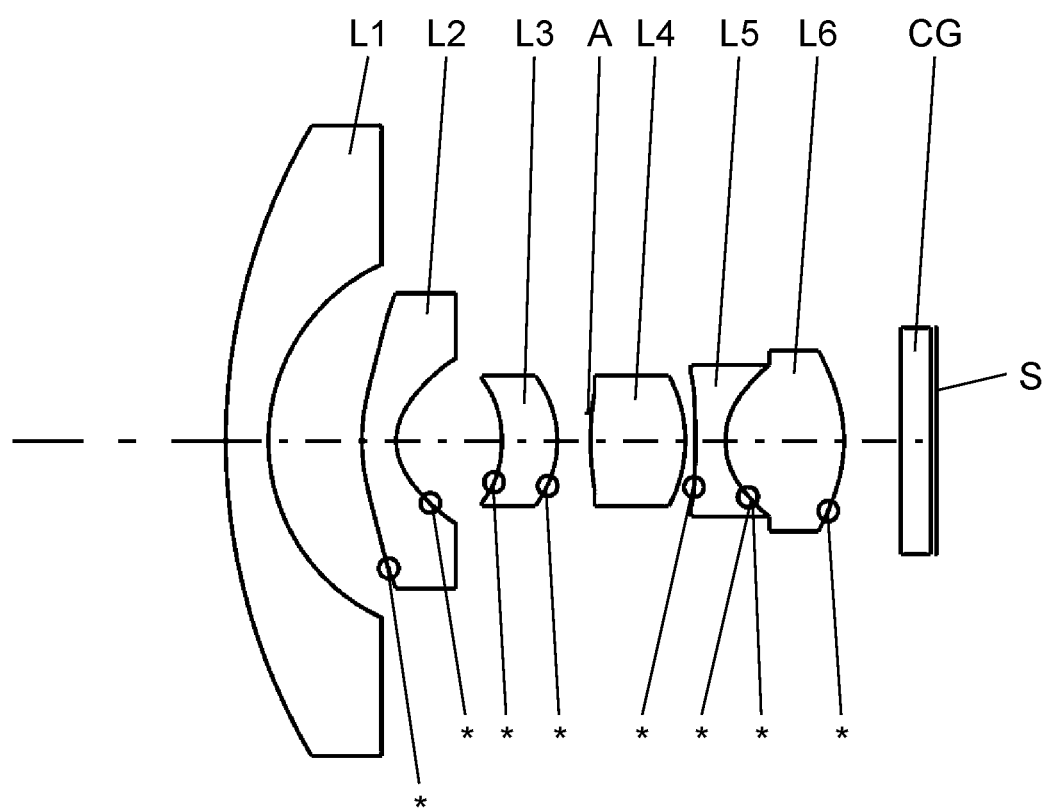
FIG. 5 is a lens arrangement diagram showing a fixed focal length lens system according to a third exemplary embodiment (a third numerical example) in an infinity focusing state.
Figure 6:
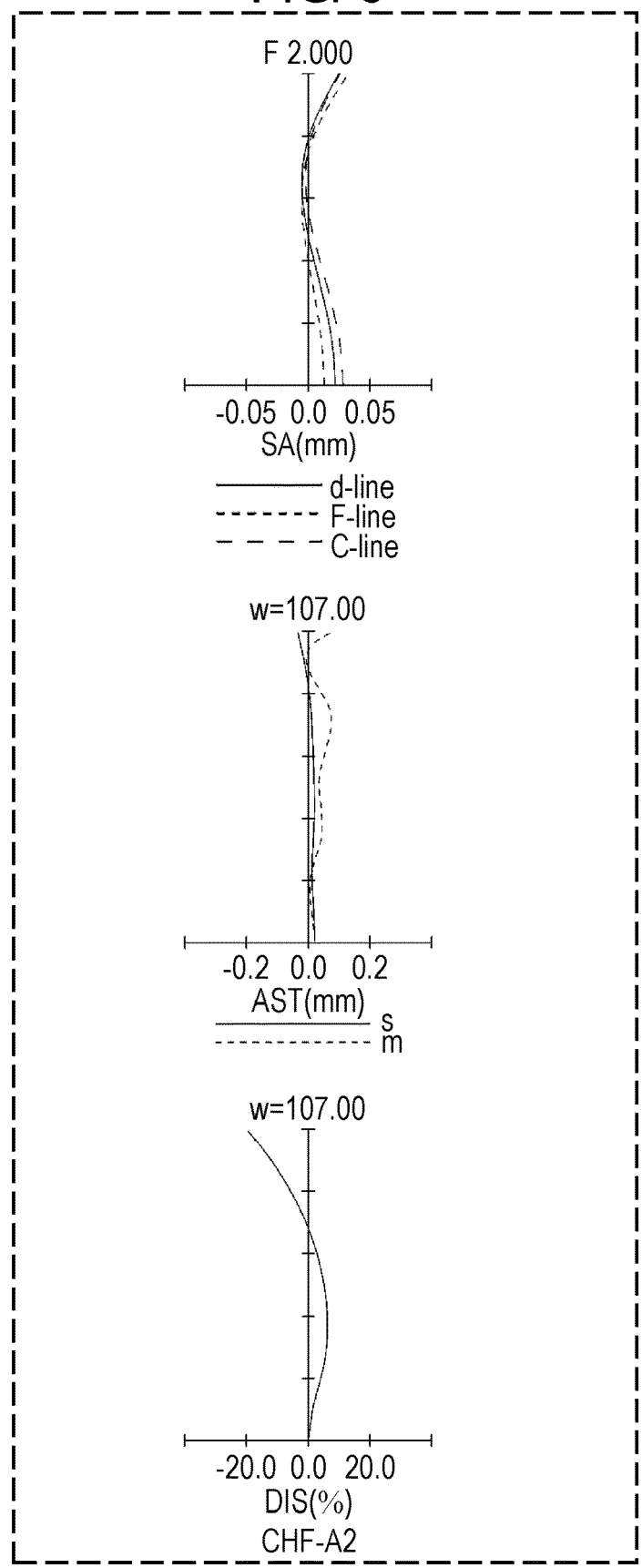
FIG. 6 is a longitudinal aberration diagram of the fixed focal length lens system according to the third numerical example in the infinity focusing state.

FIG. 5 shows a fixed focal length lens system according to a third exemplary embodiment.

The fixed focal length lens system according to the third exemplary embodiment includes, in order from an object side to an image side, first lens element L1 having negative power, second lens element L2 having negative power, third lens element L3 having positive power, aperture diaphragm A, fourth lens element L4 having positive power, fifth lens element L5 having negative power, sixth lens element L6 having positive power, and parallel plate CG.

Each of the lens elements will be described.

First lens element L1 is a meniscus lens having a convex surface on the object side.

Second lens element L2 is a meniscus lens having a convex surface on the object side. Second lens element L2 has an aspherical shape on each of the convex surface on the object side and a concave surface on the image side.

Third lens element L3 is a meniscus lens having a convex surface on the image side. Third lens element L3 has an aspherical shape on each of a concave surface on the object side and the convex surface on the image side.

Fourth lens element L4 is a biconvex lens made of glass.

Fifth lens element L5 is a biconcave lens. Fifth lens element L5 has an aspherical shape on each of concave surfaces on the object side and the image side.

Sixth lens element L6 is a biconvex lens. Sixth lens element L6 has an aspherical shape on each of convex surfaces on the object side and the image side.

Fifth lens element L5 and sixth lens element L6 are cemented to each other with an agent such as an adhesive to make up a cemented lens.

Fourth Exemplary Embodiment

Figure 7:
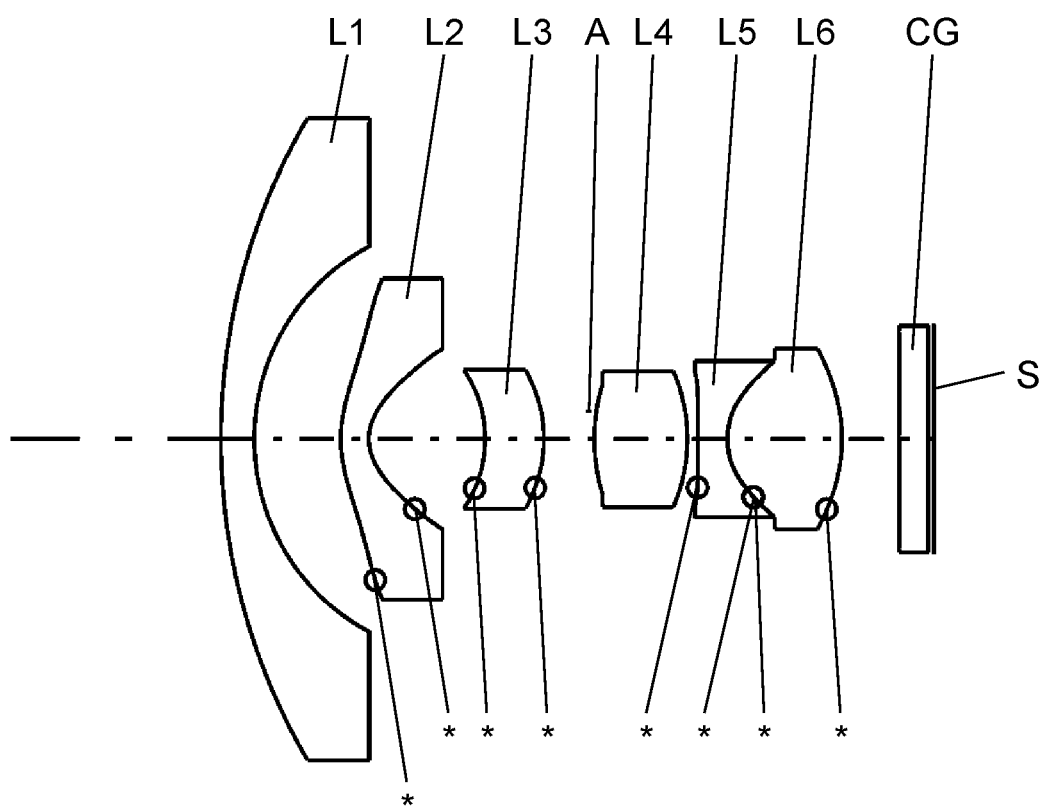
FIG. 7 is a lens arrangement diagram showing a fixed focal length lens system according to a fourth exemplary embodiment (a fourth numerical example) in an infinity focusing state.
Figure 8:
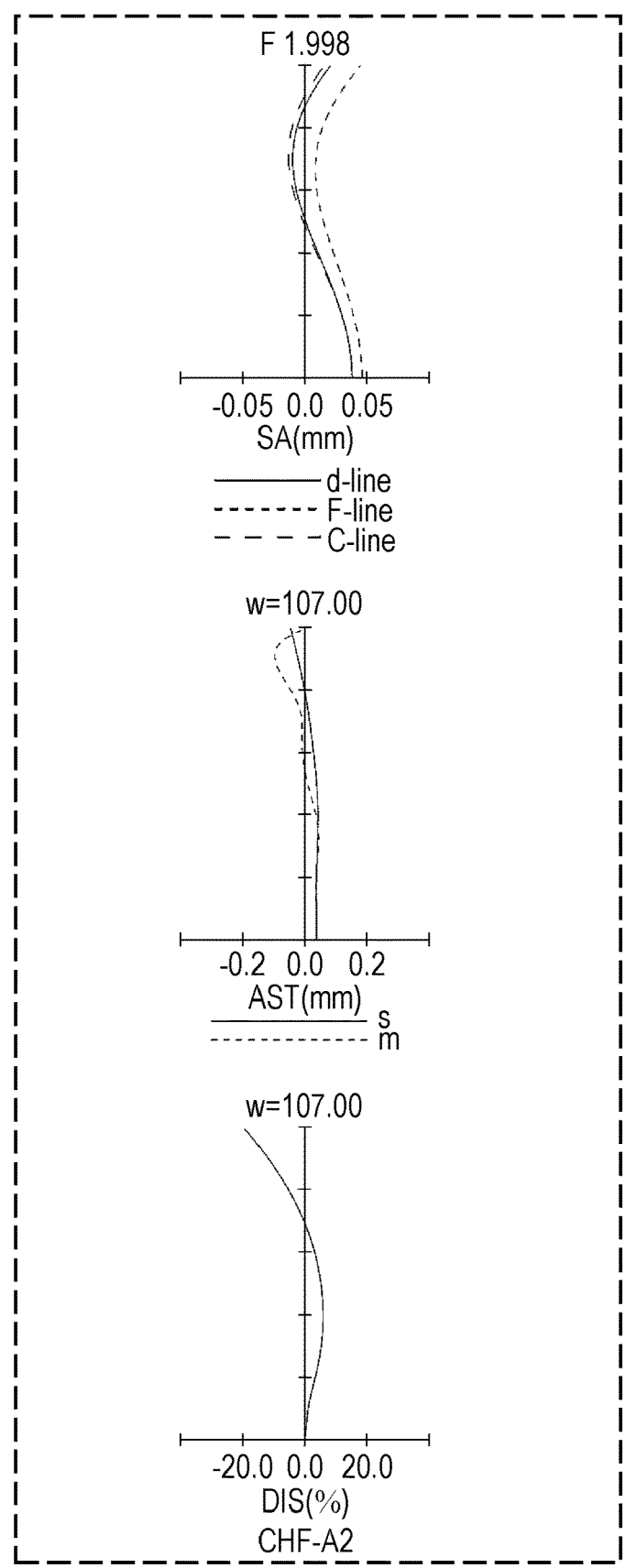
FIG. 8 is a longitudinal aberration diagram of the fixed focal length lens system according to the fourth numerical example in the infinity focusing state.

FIG. 7 shows a fixed focal length lens system according to a fourth exemplary embodiment.

The fixed focal length lens system according to the fourth exemplary embodiment includes, in order from an object side to an image side, first lens element L1 having negative power, second lens element L2 having negative power, third lens element L3 having positive power, aperture diaphragm A, fourth lens element L4 having positive power, fifth lens element L5 having negative power, sixth lens element L6 having positive power, and parallel plate CG.

Each of the lens elements will be described.

First lens element L1 is a meniscus lens having a convex surface on the object side.

Second lens element L2 is a meniscus lens having a convex surface on the object side. Second lens element L2 has an aspherical shape on each of the convex surface on the object side and a concave surface on the image side.

Third lens element L3 is a meniscus lens having a convex surface on the image side. Third lens element L3 has an aspherical shape on each of a concave surface on the object side and the convex surface on the image side.

Fourth lens element L4 is a biconvex lens made of glass.

Fifth lens element L5 is a biconcave lens. Fifth lens element L5 has an aspherical shape on each of concave surfaces on the object side and the image side.

Sixth lens element L6 is a biconvex lens. Sixth lens element L6 has an aspherical shape on each of convex surfaces on the object side and the image side.

Fifth lens element L5 and sixth lens element L6 are cemented to each other with an agent such as an adhesive to make up a cemented lens.

Fifth Exemplary Embodiment

Figure 9:
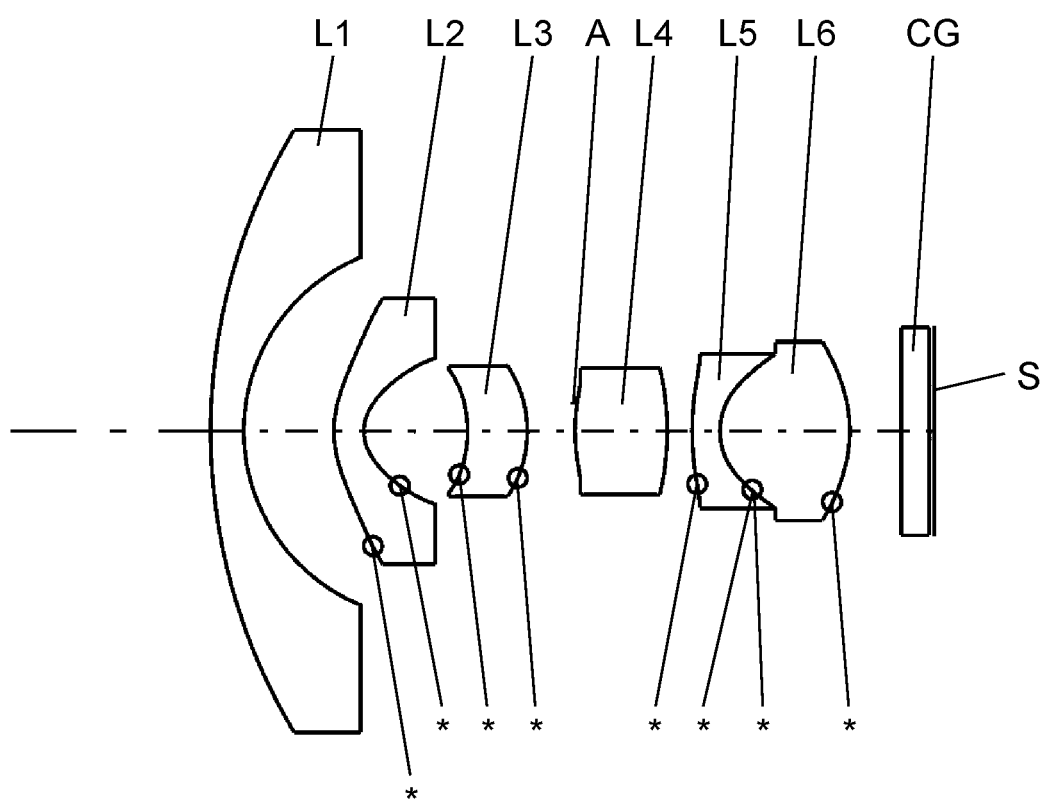
FIG. 9 is a lens arrangement diagram showing a fixed focal length lens system according to a fifth exemplary embodiment (a fifth numerical example) in an infinity focusing state.
Figure 10:
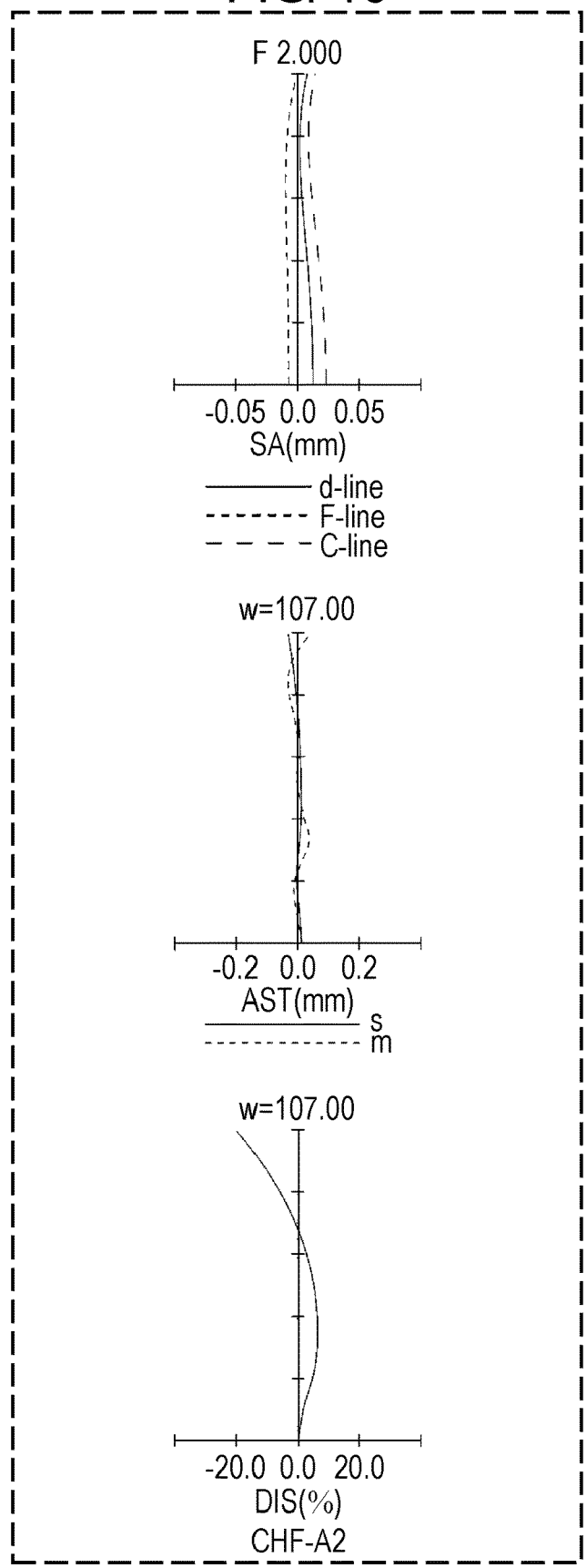
FIG. 10 is a longitudinal aberration diagram of the fixed focal length lens system according to the fifth numerical example in the infinity focusing state.

FIG. 9 shows a fixed focal length lens system according to a fifth exemplary embodiment.

The fixed focal length lens system according to the fifth exemplary embodiment includes, in order from an object side to an image side, first lens element L1 having negative power, second lens element L2 having negative power, third lens element L3 having positive power, aperture diaphragm A, fourth lens element L4 having positive power, fifth lens element L5 having negative power, sixth lens element L6 having positive power, and parallel plate CG.

Each of the lens elements will be described.

First lens element L1 is a meniscus lens having a convex surface on the object side.

Second lens element L2 is a meniscus lens having a convex surface on the object side. Second lens element L2 has an aspherical shape on each of the convex surface on the object side and a concave surface on the image side.

Third lens element L3 is a meniscus lens having a convex surface on the image side. Third lens element L3 has an aspherical shape on each of a concave surface on the object side and the convex surface on the image side.

Fourth lens element L4 is a biconvex lens made of glass.

Fifth lens element L5 is a meniscus lens having a convex surface on the object side. Fifth lens element L5 has an aspherical shape on each of the convex surface on the object side and a concave surface on the image side. Sixth lens element L6 is a biconvex lens. Sixth lens element L6 has an aspherical shape on each of convex surfaces on the object side and the image side.

Fifth lens element L5 and sixth lens element L6 are cemented to each other with an agent such as an adhesive to make up a cemented lens.

Sixth Exemplary Embodiment

Figure 11:
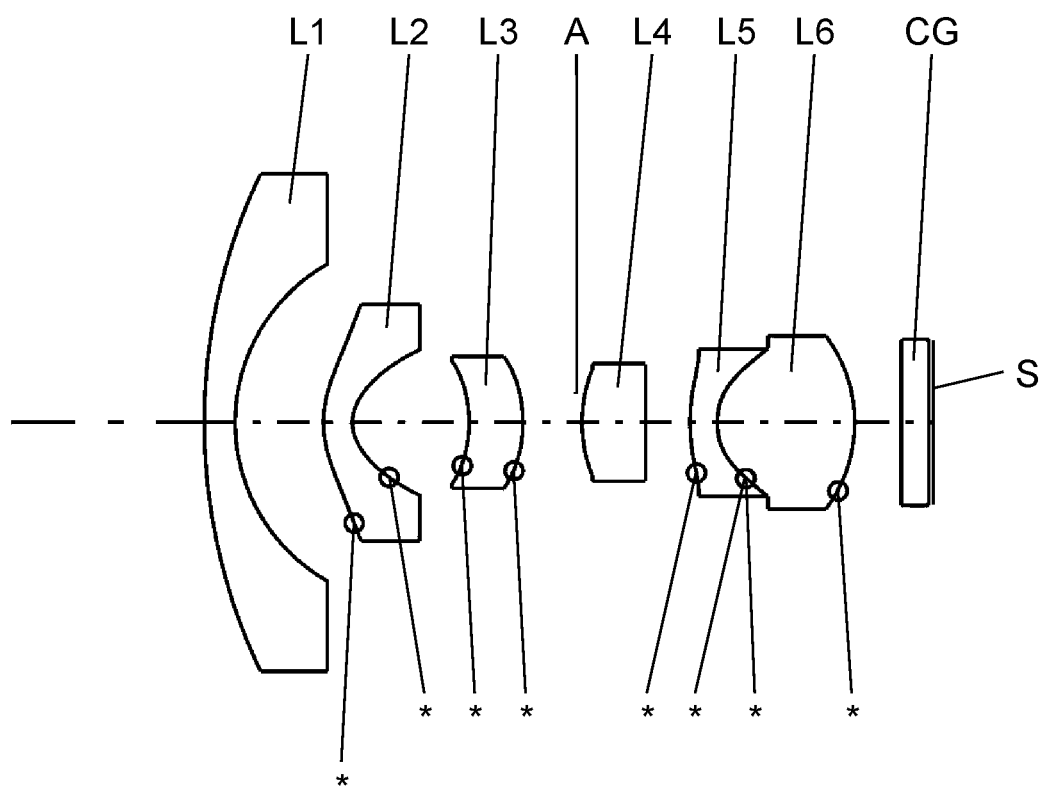
FIG. 11 is a lens arrangement diagram showing a fixed focal length lens system according to a sixth exemplary embodiment (a sixth numerical example) in an infinity focusing state.
Figure 12:
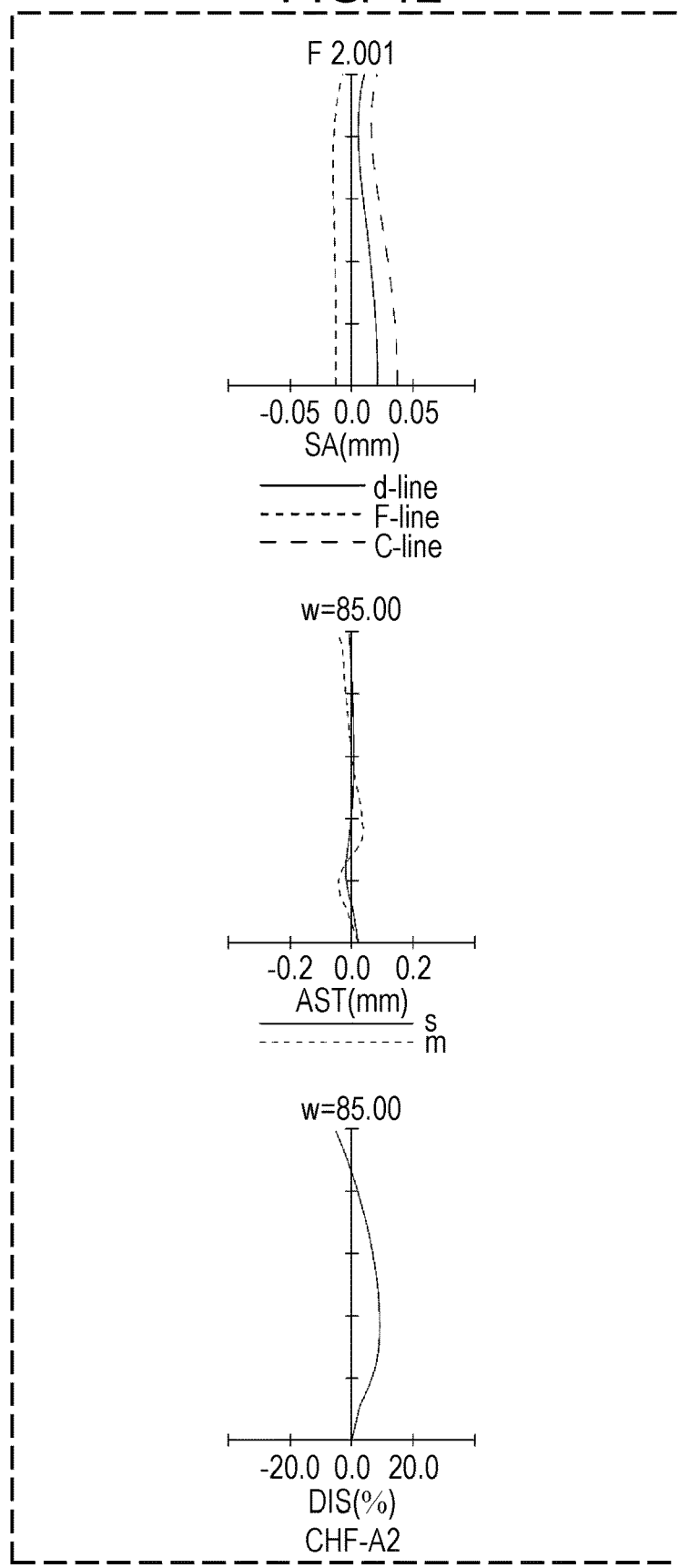
FIG. 12 is a longitudinal aberration diagram of the fixed focal length lens system according to the sixth numerical example in the infinity focusing state.

FIG. 11 shows a fixed focal length lens system according to a sixth exemplary embodiment.

The fixed focal length lens system according to the sixth exemplary embodiment includes, in order from an object side to an image side, first lens element L1 having negative power, second lens element L2 having negative power, third lens element L3 having positive power, aperture diaphragm A, fourth lens element L4 having positive power, fifth lens element L5 having negative power, sixth lens element L6 having positive power, and parallel plate CG.

Each of the lens elements will be described.

First lens element L1 is a meniscus lens having a convex surface on the object side.

Second lens element L2 is a meniscus lens having a convex surface on the object side. Second lens element L2 has an aspherical shape on each of the convex surface on the object side and a concave surface on the image side.

Third lens element L3 is a meniscus lens having a convex surface on the image side. Third lens element L3 has an aspherical shape on each of a concave surface on the object side and the convex surface on the image side.

Fourth lens element L4 is a biconvex lens made of glass.

Fifth lens element L5 is a meniscus lens having a convex surface on the object side. Fifth lens element L5 has an aspherical shape on each of the convex surface on the object side and a concave surface on the image side. Sixth lens element L6 is a biconvex lens. Sixth lens element L6 has an aspherical shape on each of convex surfaces on the object side and the image side.

Fifth lens element L5 and sixth lens element L6 are cemented to each other with an agent such as an adhesive to make up a cemented lens.

Seventh Exemplary Embodiment

Figure 13:
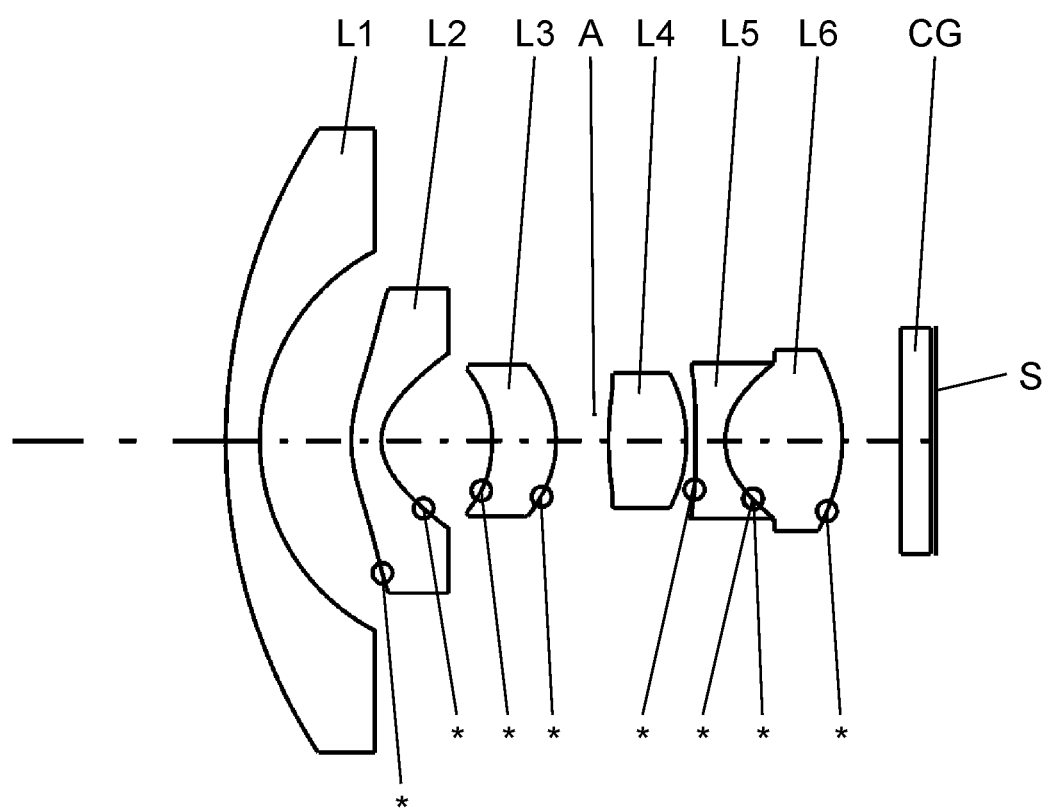
FIG. 13 is a lens arrangement diagram showing a fixed focal length lens system according to a seventh exemplary embodiment (a seventh numerical example) in an infinity focusing state.
Figure 14:
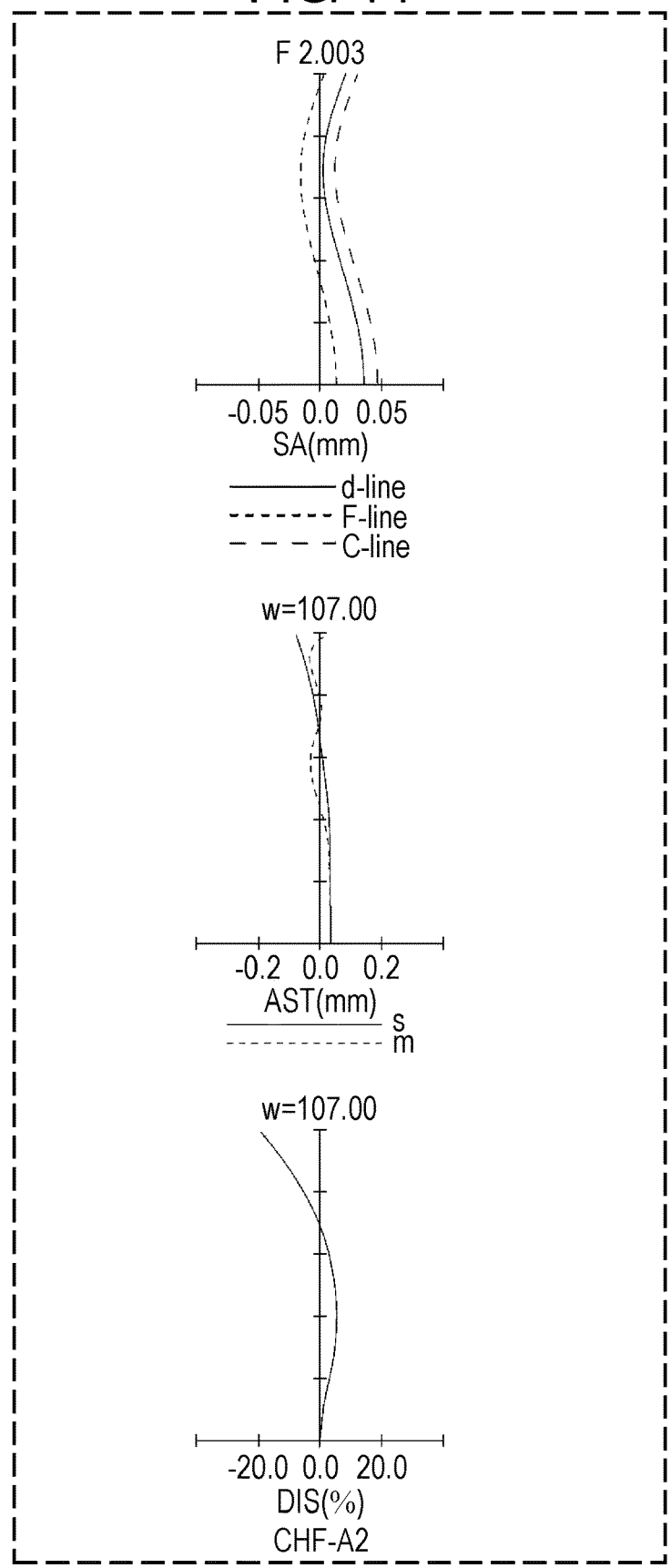
FIG. 14 is a longitudinal aberration diagram of the fixed focal length lens system according to the seventh numerical example in the infinity focusing state.

FIG. 13 shows a fixed focal length lens system according to a seventh exemplary embodiment.

The fixed focal length lens system according to the seventh exemplary embodiment includes, in order from an object side to an image side, first lens element L1 having negative power, second lens element L2 having negative power, third lens element L3 having positive power, aperture diaphragm A, fourth lens element L4 having positive power, fifth lens element L5 having negative power, sixth lens element L6 having positive power, and parallel plate CG.

Each of the lens elements will be described.

First lens element L1 is a meniscus lens having a convex surface on the object side.

Second lens element L2 is a meniscus lens made of glass, having a convex surface on the object side. Second lens element L2 has an aspherical shape on each of the convex surface on the object side and a concave surface on the image side.

Third lens element L3 is a meniscus lens made of glass, having a convex surface on the image side. Third lens element L3 has an aspherical shape on each of a concave surface on the object side and the convex surface on the image side.

Fourth lens element L4 is a biconvex lens made of glass.

Fifth lens element L5 is a biconcave lens made of glass. Fifth lens element L5 has an aspherical shape on each of concave surfaces on the object side and the image side.

Sixth lens element L6 is a biconvex lens made of glass. Sixth lens element L6 has an aspherical shape on each of convex surfaces on the object side and the image side.

Fifth lens element L5 and sixth lens element L6 are cemented to each other with an agent such as an adhesive to make up a cemented lens.

Eighth Exemplary Embodiment

Figure 15:
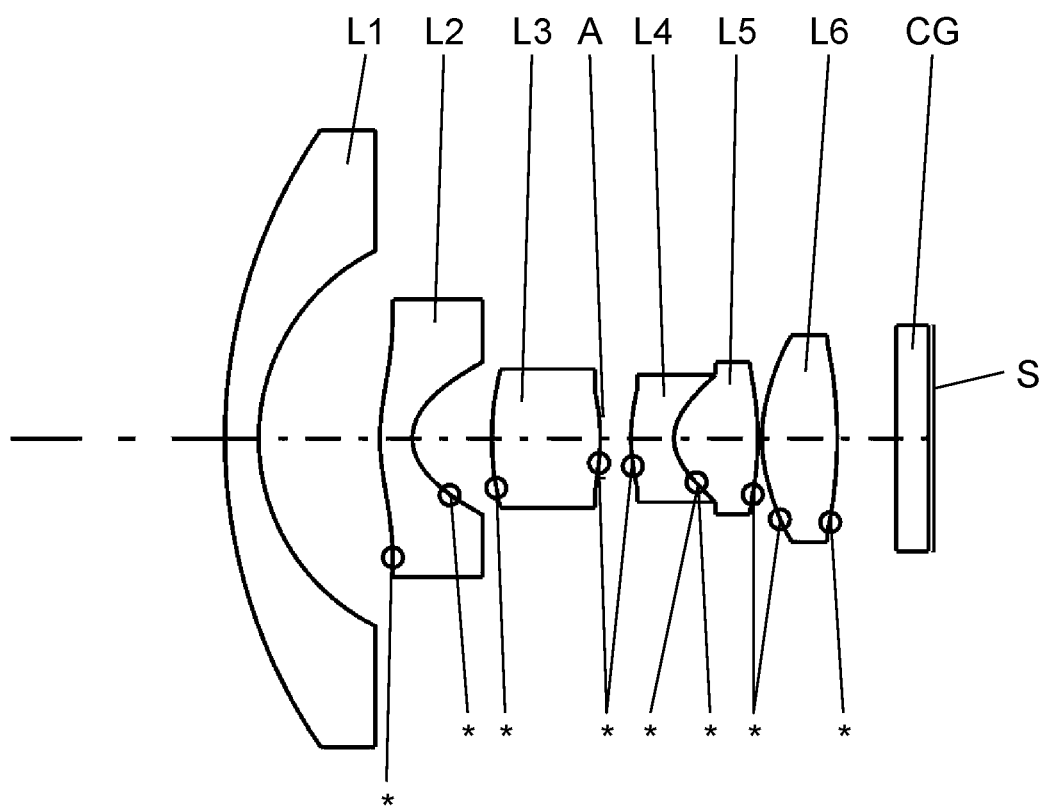
FIG. 15 is a lens arrangement diagram showing a fixed focal length lens system according to an eighth exemplary embodiment (an eighth numerical example) in an infinity focusing state.
Figure 16:
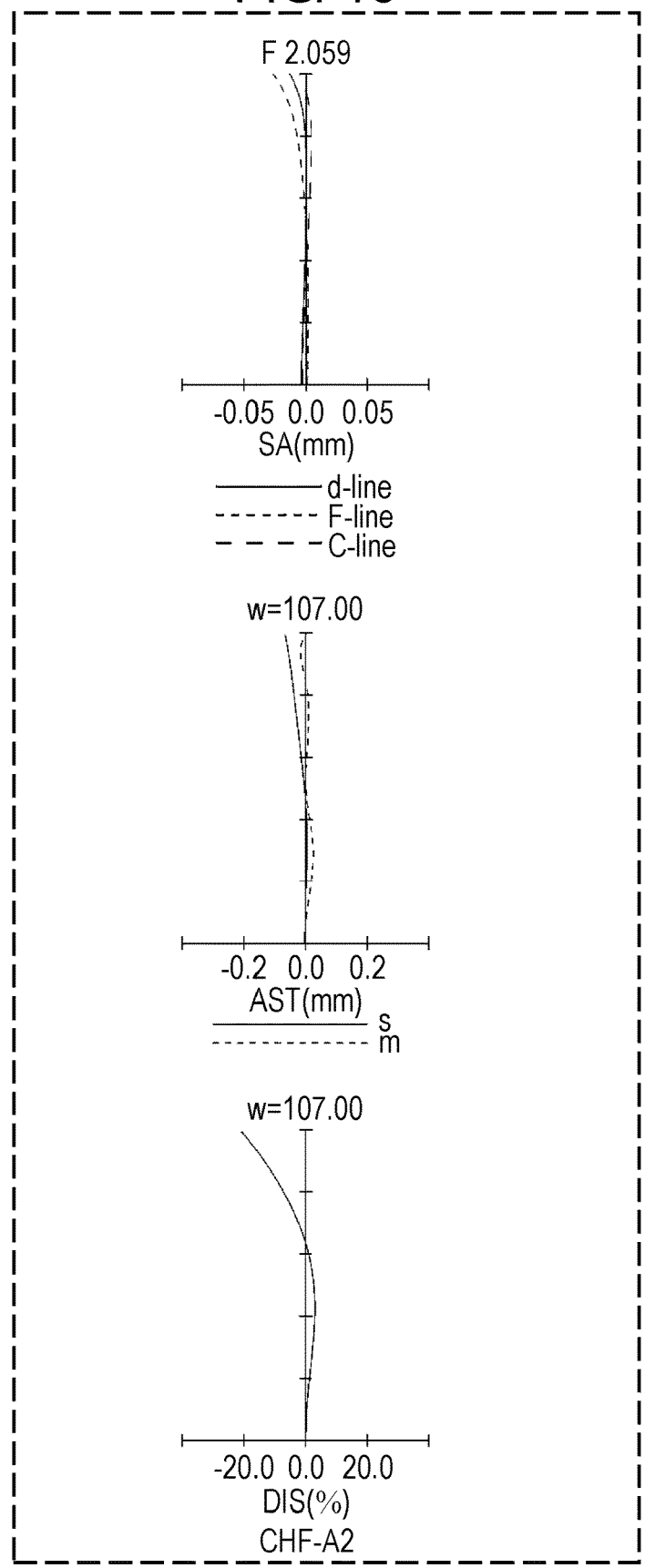
FIG. 16 is a longitudinal aberration diagram of the fixed focal length lens system according to the eighth numerical example in the infinity focusing state.

FIG. 15 shows a fixed focal length lens system according to an eighth exemplary embodiment.

The fixed focal length lens system according to the eighth exemplary embodiment includes, in order from an object side to an image side, first lens element L1 having negative power, second lens element L2 having negative power, third lens element L3 having positive power, aperture diaphragm A, fourth lens element L4 having negative power, fifth lens element L5 having positive power, sixth lens element L6 having positive power, and parallel plate CG.

Each of the lens elements will be described.

First lens element L1 is a meniscus lens having a convex surface on the object side.

Second lens element L2 is a meniscus lens having a convex surface on the object side. Second lens element L2 has an aspherical shape on each of the convex surface on the object side and a concave surface on the image side.

Third lens element L3 is a biconvex lens. Third lens element L3 has an aspherical shape on each of convex surfaces on the object side and the image side.

Fourth lens element L4 is a meniscus lens having a convex surface on the object side. Fourth lens element L4 has an aspherical shape on a concave surface on the image side.

Fifth lens element L5 is a biconvex lens. Fifth lens element L5 has an aspherical shape on each of convex surfaces on the object side and the image side.

Sixth lens element L6 is a biconvex lens made of glass. Sixth lens element L6 has an aspherical shape on each of convex surfaces on the object side and the image side.

Fourth lens element L4 and fifth lens element L5 are cemented to each other with an agent such as an adhesive to make up a cemented lens.

Ninth Exemplary Embodiment

Figure 17:
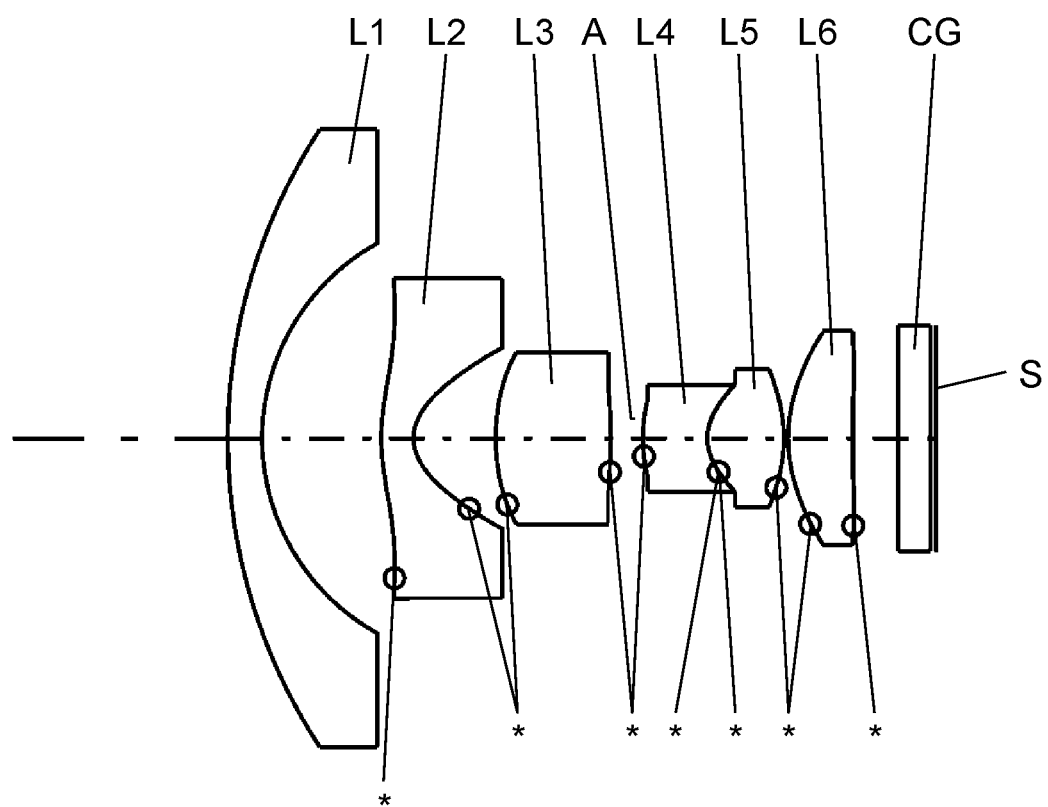
FIG. 17 is a lens arrangement diagram showing a fixed focal length lens system according to a ninth exemplary embodiment (a ninth numerical example) in an infinity focusing state.
Figure 18:
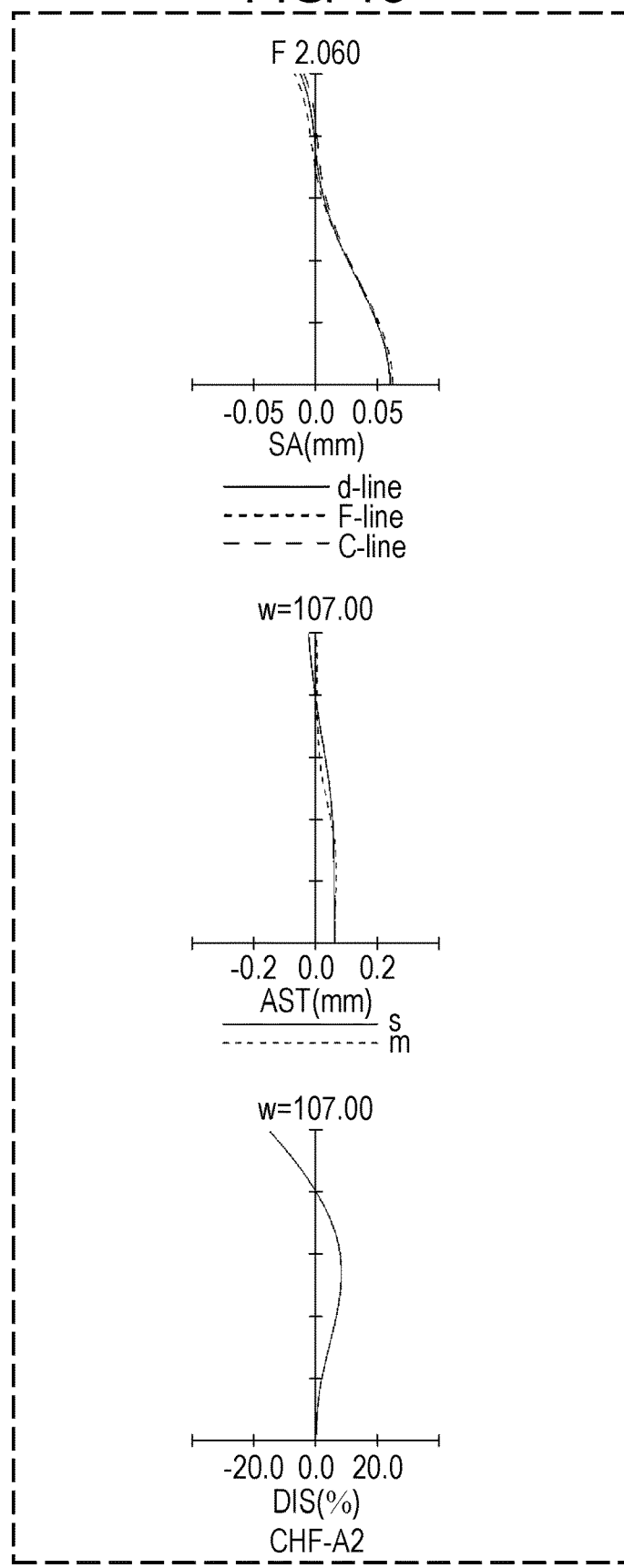
FIG. 18 is a longitudinal aberration diagram of the fixed focal length lens system according to the ninth numerical example in the infinity focusing state.

FIG. 17 shows a fixed focal length lens system according to a ninth exemplary embodiment.

The fixed focal length lens system according to the ninth exemplary embodiment includes, in order from an object side to an image side, first lens element L1 having negative power, second lens element L2 having negative power, third lens element L3 having positive power, aperture diaphragm A, fourth lens element L4 having negative power, fifth lens element L5 having positive power, sixth lens element L6 having positive power, and parallel plate CG.

Each of the lens elements will be described.

First lens element L1 is a meniscus lens having a convex surface on the object side.

Second lens element L2 is a meniscus lens having a convex surface on the object side. Second lens element L2 has an aspherical shape on each of the convex surface on the object side and a concave surface on the image side.

Third lens element L3 is a biconvex lens. Third lens element L3 has an aspherical shape on each of convex surfaces on the object side and the image side.

Fourth lens element L4 is a meniscus lens made of glass, having a convex surface on the object side. Fourth lens element L4 has an aspherical shape on a concave surface on the image side.

Fifth lens element L5 is a biconvex lens made of glass. Fifth lens element L5 has an aspherical shape on each of convex surfaces on the object side and the image side.

Sixth lens element L6 is a biconvex lens made of glass. Sixth lens element L6 has an aspherical shape on each of convex surfaces on the object side and the image side.

Fourth lens element L4 and fifth lens element L5 are cemented to each other with an agent such as an adhesive to make up a cemented lens.

(Condition and Advantageous Effect)

Hereinafter, a description will be given on such conditions that it is beneficial for a fixed focal length lens system, for example, the fixed focal length lens systems according to the first to ninth exemplary embodiments to satisfy. Note that a plurality of beneficial conditions is set for the fixed focal length lens systems of the exemplary embodiments, and a configuration of a fixed focal length lens system satisfying all of the conditions is the most effective. However, by satisfying any of the individual conditions, it is possible to obtain a fixed focal length lens system providing an effect corresponding to the satisfied condition.

A fixed focal length lens system according to the present disclosure, such as the fixed focal length lens systems of the first to the ninth exemplary embodiments, includes, in order from an object side to an image side, first lens element L1 having negative power, second lens element L2 having negative power, third lens element L3 having positive power, fourth lens element L4 having power, fifth lens element L5 having power, and sixth lens element L6 having positive power. At least one of second to sixth lens elements L2 to L6 is made of glass.

Hereinafter, this lens configuration is referred to as a basic configuration of an exemplary embodiment.

In addition, a fixed focal length lens system having the basic configuration desirably satisfies condition (1), for example, shown below.

$$0 < (L1R2 + L2R1)/(L1R2 - L2R1) < 100 \quad (1)$$

where L1R2 is a radius of curvature of an image-side surface of first lens element L1, and L2R1 is a radius of curvature of an object-side surface of second lens element L2.

Condition (1) is a condition for specifying a shape factor of an air lens put between first lens element L1 and the second lens element L2. Less than or equal to a lower limit of condition (1) or greater than or equal to an upper limit of conditional expression (1) means an increase in spherical aberration of light rays passing close to an optical axis of the fixed focal length lens system having the basic configuration, causing a decrease in resolution.

Preferably, by satisfying any one of or both of conditions (1a) and (1b) shown below, the above effect can be more successfully provided.

$$1.5<(L1R2+L2R1)/(L1R2-L2R1) \quad (1a)$$

$$(L1R2+L2R1)/(L1R2-L2R1)<30.0 \quad (1b)$$

More preferably, by satisfying any one of or both of conditions (1c) and (1d) shown below, the above effect can be more successfully provided.

$$2.9<(L1R2+L2R1)/(L1R2-L2R1) \quad (1c)$$

$$(L1R2+L2R1)/(L1R2-L2R1)<16.0 \quad (1d)$$

It is, for example, desirable that in the fixed focal length lens system having the basic configuration, fourth lens element L4 has positive power and fifth lens element L5 has negative power.

This brings about the above effect as well as allows the fixed focal length lens system to come down in size.

A fixed focal length lens system having the basic configuration, for example, desirably satisfies condition (2) shown below.

$$6.7<f3/L3th<30 \quad (2)$$

where f3 is a focal distance of third lens element L3, and L3th is a thickness of third lens element L3 in an optical axis direction.

Condition (2) is a condition for specifying a ratio of the focal distance of third lens element L3 to the thickness of third lens element L3 in the optical axis direction. If this ratio is less than or equal to a lower limit of condition (2) or is greater than or equal to an upper limit of conditional expression (2), the lens system cannot satisfactorily correct aberrations, in particular an axial chromatic aberration, and thus causes a decrease in resolution.

Preferably, by satisfying any one of or both of conditions (2a) and (2b) shown below, the above effect can be more successfully provided.

$$7.0<f3/L3th \quad (2a)$$

$$f3/L3th<23 \quad (2b)$$

More preferably, by satisfying any one of or both of conditions (2c) and (2d) shown below, the above effect can be more successfully provided.

$$7.3<f3/L3th \quad (2c)$$

$$f3/L3th<10 \quad (2d)$$

A fixed focal length lens system having the basic configuration, for example, desirably satisfies condition (3) shown below.

$$-1.8<(L4R2+L5R1)/(L4R2-L5R1)<5.9 \quad (3)$$

where L4R2 is a radius of curvature of an image-side surface of fourth lens element L4, and L5R1 is a radius of curvature of an object-side surface of fifth lens element L5.

Condition (3) is a condition for specifying a shape factor of an air lens put between fourth lens element L4 and fifth lens element L5. If this shape factor is less than or equal to a lower limit of condition (3) or is greater than or equal to an upper limit of conditional expression (3), the lens system cannot satisfactorily correct aberrations, in particular astigmatism, and thus causes a decrease in resolution.

Preferably, by satisfying any one of or both of conditions (3a) and (3b) shown below, the above effect can be more successfully provided.

$$-1.6<(L4R2+L5R1)/(L4R2-L5R1) \quad (3a)$$

$$(L4R2+L5R1)/(L4R2-L5R1)<3.0 \quad (3b)$$

More preferably, by satisfying any one of or both of conditions (3c) and (3d) shown below, the above effect can be more successfully provided.

$$-1.5<(L4R2+L5R1)/(L4R2-L5R1) \quad (3c)$$

$$(L4R2+L5R1)/(L4R2-L5R1)<0 \quad (3d)$$

A fixed focal length lens system having the basic configuration, for example, desirably satisfies condition (4) shown below.

$$8.8<(L3R1+L3R2)/(L3R1-L3R2)<130 \quad (4)$$

where L3R1 is a radius of curvature of an object-side surface of third lens element L3, and L3R2 is a radius of curvature of an images-side surface of third lens element L3.

Condition (4) is a condition for specifying a shape factor of third lens element L3. If this shape factor is less than or equal to a lower limit of condition (4) or is greater than or equal to an upper limit of conditional expression (4), the lens system cannot satisfactorily correct aberrations, in particular a coma aberration, and thus causes a decrease in resolution.

Preferably, by satisfying any one of or both of conditions (4a) and (4b) shown below, the above effect can be more successfully provided.

$$9.0<(L3R1+L3R2)/(L3R1-L3R2) \quad (4a)$$

$$(L3R1+L3R2)/(L3R1-L3R2)<70 \quad (4b)$$

More preferably, by satisfying any one of or both of conditions (4c) and (4d) shown below, the above effect can be more successfully provided.

$$10.0<(L3R1+L3R2)/(L3R1-L3R2) \quad (4c)$$

$$(L3R1+L3R2)/(L3R1-L3R2)<20 \quad (4d)$$

A fixed focal length lens system having the basic configuration, for example, desirably satisfies condition (5) shown below.

$$0.78<(L5R1+L5R2)/(L5R1-L5R2)<2.5 \quad (5)$$

where L5R1 is a radius of curvature of an object-side surface of fifth lens element L5, and L5R2 is a radius of curvature of an image-side surface of fifth lens element L5.

Condition (5) is a condition for specifying a shape factor of fifth lens element L5. If this shape factor is less than or equal to a lower limit of condition (5) or is greater than or equal to an upper limit of conditional expression (5), the lens system cannot satisfactorily correct aberrations, in particular astigmatism, and thus causes a decrease in resolution.

Preferably, by satisfying any one of or both of conditions (5a) and (5b) shown below, the above effect can be more successfully provided.

$$0.80<(L5R1+L5R2)/(L5R1-L5R2) \quad (5a)$$

$$(L5R1+L5R2)/(L5R1-L5R2)<1.5 \quad (5b)$$

More preferably, by satisfying any one of or both of conditions (5c) and (5d) shown below, the above effect can be more successfully provided.

$$0.82<(L5R1+L5R2)/(L5R1-L5R2) \quad (5c)$$

$$L5R1+L5R2)/(L5R1-L5R2)<1.2 \quad (5d)$$

A fixed focal length lens system having the basic configuration, for example, desirably satisfies condition (6) shown below.

$$vL6 > 45 \quad (6)$$

where vL6 is an Abbe number of sixth lens element L6.

Condition (6) is a condition for specifying the Abbe number of sixth lens element L6. Less than or equal to a lower limit of condition (6) means that the Abbe number of sixth lens element L6 is too small. As a result, the lens system cannot satisfactorily correct aberrations, in particular a chromatic aberration of magnification, and thus causes a decrease in resolution.

Tenth Exemplary Embodiment: Camera

A camera including the fixed focal length lens system according to the first exemplary embodiment will be described, with an on-vehicle camera taken as an example. Note that the on-vehicle camera may include any one of the fixed focal length lens systems according to the second to ninth exemplary embodiments instead of the fixed focal length lens system according to the first exemplary embodiment.

Figure 19:
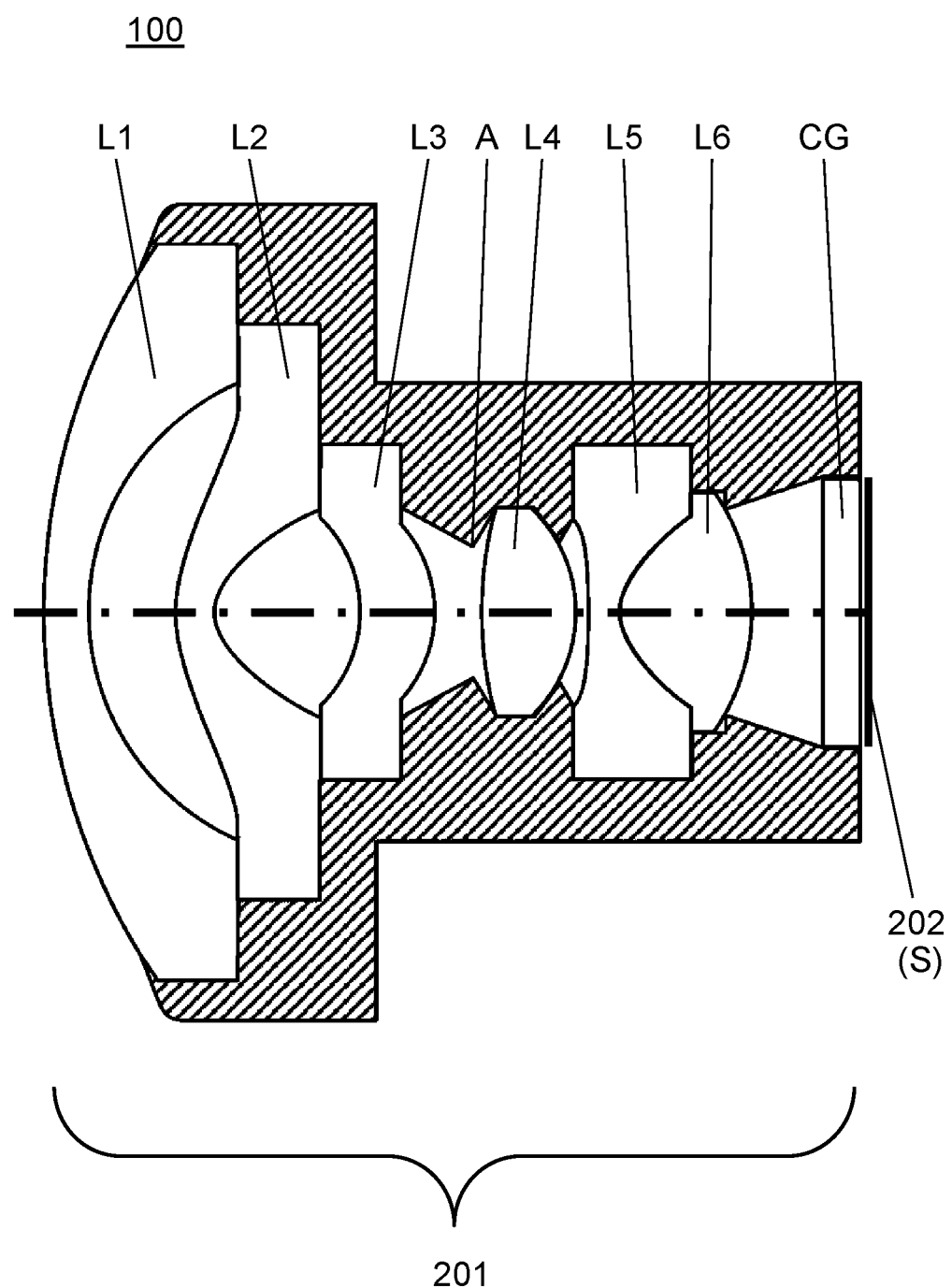
FIG. 19 is a schematic diagram of an on-vehicle camera equipped with the fixed focal length lens system according to the first exemplary embodiment.

FIG. 19 is a schematic diagram of an on-vehicle camera equipped with the fixed focal length lens system according to the first exemplary embodiment.

On-vehicle camera 100 includes fixed focal length lens system 201 to form an optical image of an object and imaging device 202 to convert the optical image formed by fixed focal length lens system 201 into an electrical image signal. Imaging device 202 is disposed at a position of image plane S in the fixed focal length lens system according to the first exemplary embodiment.

Figure 20:
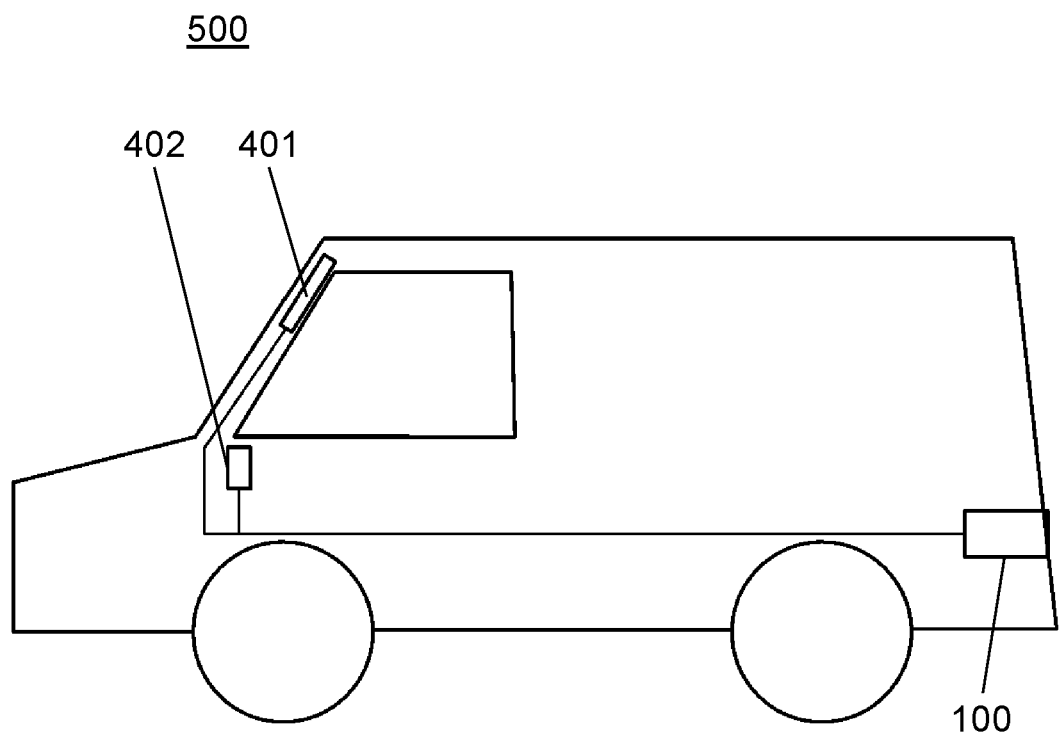
FIG. 20 is a schematic diagram of a vehicle equipped with the on-vehicle camera at a rear position.

FIG. 20 is a schematic diagram of vehicle 500 equipped with on-vehicle camera 100 at a rear position.

On-vehicle camera 100 is installed in vehicle 500 and is used as a sensing camera or a view camera. An image taken by the sensing camera is used to check an inter-vehicle distance to another vehicle and the like. An image taken by the view camera is displayed on a monitor in the vehicle to allow the driver to check an area surrounding the vehicle such as ahead of the vehicle, behind the vehicle, and on a side of the vehicle.

An image signal acquired by imaging device 202 is, for example, displayed on a device such as display device 401 or display device 402 located in a front of a cabin of vehicle 500. The image signal is, for example, stored as image data in a memory.

Display device 401 is an electronic room mirror, for example.

Display device 402 is a display device in a navigation system or on a front panel, for example.

Thus, vehicle 500 can display an image of an area behind the vehicle on the device such as display device 401 or display device 402 via on-vehicle camera 100 including fixed focal length lens system 201. This configuration enables an occupant such as the driver to view an area behind vehicle 500.

As described above, the fixed focal length lens system of the present disclosure is effective as a lens system for a view camera but can be used also as a lens system for a sensing camera.

The tenth exemplary embodiment has been described above as an example of the technique disclosed in the present application. However, the technique of the present disclosure can be applied not only to the above exemplary embodiments but also to exemplary embodiments in which modification, replacement, addition, or omission is appropriately made.

A lens element having substantially no power may be added as appropriate to any of the fixed focal length lens systems according to the first to ninth exemplary embodiments.

The aspherical shape on the lens elements included in the fixed focal length lens systems of the first to ninth exemplary embodiments may be formed by a process other than polishing and molding. The lens element may be, for example, what is called a replicated lens (a hybrid lens) in which an aspherical coating is formed on a surface of a spherical lens.

Note that as the tenth exemplary embodiment, an example has been shown in which the fixed focal length lens system according to any of the first to ninth exemplary embodiments in the present disclosure is applied to the on-vehicle camera as a sensing camera or a view camera; however, it is a matter of course that the fixed focal length lens system of the present disclosure can be applied to a surveillance camera in a surveillance system, a web camera, and other cameras.

(Numerical Examples)

Hereinafter, a description will be given on numerical examples implemented in the fixed focal length lens systems according to the first to ninth exemplary embodiments. Note that in the numerical examples, the lengths in the tables are all in the unit of "mm", and the angles of view are all in the unit of "degree (°)". Note that the expression "angle of view" in the tables represents a diagonal half angle of view. In each numerical example, r is a radius of curvature, d is an interplanar spacing, nd is a refractive index to the d line, and vd is an Abbe number to the d line. Further, in the numerical examples, the surfaces marked with * are aspherical, and the aspherical shapes are defined by the following equation.

$$Z = \frac{h^2/r}{1 + \sqrt{1-(1+\kappa)(h/r)^2}} + \Sigma A_n h^n \quad \text{[Mathematical Expression 1]}$$

where

Z is a distance from a point on the aspherical surface having height h from the optical axis to a tangential plane at a peak of the aspherical surface, h is a height from the optical axis, r is a radius of curvature at the peak, κ is a conic constant, and An is an aspherical coefficient of n-th order.

FIGS. 2, 4, 6, 8, 10, 12, 14, 16, and 18 are longitudinal aberration diagrams of respective fixed focal length lens systems in the infinity focusing state according to the first to ninth numerical examples.

Each longitudinal aberration diagram shows, in order from the top, a spherical aberration (SA (mm)), an astigmatism (AST (mm)), and a distortion (DIS (%)).

In each spherical aberration diagram, the vertical axis represents an F number (indicated by F in the drawing). The solid line, the short broken line, and the long broken line represent characteristics for a d-line, an F-line, and a C-line, respectively.

In each astigmatism diagram, the vertical axis represents an image height. The solid line and the broken line represent characteristics for a sagittal plane (indicated by s in the drawing) and a meridional plane (indicated by m in the drawing), respectively. Note that, w represents a half angle of view.

In each distortion diagram, the vertical axis represents an image height, and w represents a half angle of view.

Here, the solid line of distortion shows an aberration, assuming $Y=2f\cdot\tan(\omega/2)$ as the ideal image height (Y is an image height, and f is a focal distance of the entire system).

(First Numerical Example)

The fixed focal length lens system according to the first numerical example corresponds to the first exemplary embodiment shown in FIG. 1.

TABLE 2

(Surface data)

| Surface number | r | d | nd | vd | Effective diameter |
|---|---|---|---|---|---|
| Object surface | ∞ | | | | |
| 1 | 13.89440 | 0.90000 | 1.80420 | 46.5 | 7.201 |
| 2 | 4.92320 | 1.61040 | | | |
| 3* | 2.46160 | 0.80000 | 1.53345 | 55.6 | 3.696 |
| 4* | 0.96050 | 2.84200 | | | |
| 5* | −3.00920 | 1.40000 | 1.65521 | 21.1 | 1.373 |
| 6* | −2.46880 | 0.55570 | | | 5.171 |
| 7(diaphragm) | ∞ | 0.36230 | | | 0.983 |
| 8 | 6.65070 | 1.80000 | 1.61800 | 63.4 | |
| 9 | −3.14270 | 0.20000 | | | |
| 10* | −28.44780 | 0.70000 | 1.65521 | 21.1 | |
| 11* | 1.99800 | 0.00500 | 1.56732 | 42.8 | 5.569 |
| 12* | 1.99800 | 2.66000 | 1.53345 | 55.6 | 5.569 |
| 13* | −3.18430 | 1.33960 | | | 2.071 |
| 14 | ∞ | 0.70000 | 1.51680 | 64.2 | |
| 15 | ∞ | 0.12500 | | | |
| 16 | ∞ | BF | | | |
| Image surface | ∞ | | | | |

TABLE 3

(Aspherical data)

Third surface

K = −2.77345E+00, A4 = −8.69299E−03, A6 = 6.40902E−04, A8 = −1.84432E−05 A10 = 2.66558E−07, A12 = 0.00000E+00, A14 = 0.00000E+00
Fourth surface K = −1.37298E+00, A4 = 7.00751E−03, A6 = 2.15555E−02, A8 = −1.66384E−02 A10 = 6.07196E−03, A12 = −1.14461E−03, A14 = 9.08834E−05
Fifth surface K = −6.73669E−01, A4 = −2.29936E−02, A6 = −3.25541E−03, A8 = 2.82193E−03 A10 = −2.02837E−04, A12 = −1.34352E−05, A14 = 3.55056E−23
Sixth surface K = −1.93923E+00, A4 = −1.50364E−02, A6 = 1.54529E−03, A8 = 6.56925E−04 A10 = −1.14482E−04, A12 = 2.89897E−06, A14 = 3.55056E−23
Tenth surface K = 1.54327E+02, A4 = 1.19846E−02, A6 = −1.81563E−02, A8 = 5.98018E−03 A10 = −7.03437E−04, A12 = −1.53803E−05, A14 = 3.55056E−23
Eleventh surface K = −5.68372E−01, A4 = 1.23446E−01, A6 = −8.12680E−02, A8 = 2.27669E−02 A10 = −2.63734E−03, A12 = 5.60579E−05, A14 = 3.55056E−23

TABLE 3-continued (Aspherical data)

Twelfth surface

K = −5.68372E−01, A4 = 1.23446E−01, A6 = −8.12680E−02, A8 = 2.27669E−02 A10 = −2.63734E−03, A12 = 5.60579E−05, A14 = 3.55056E−23
Thirteenth surface K = −1.37037E+01, A4 = −2.89921E−02, A6 = 7.38479E−03, A8 = −1.02766E−03 A10 = 6.56013E−05, A12 = 1.31390E−20, A14 = 0.00000E+00

TABLE 4

(Various pieces of data)

| Focal distance | 1.2161 |
|---|---|
| F number | 1.99962 |
| View angle | 107.0000 |
| Imaged height | 2.6315 |
| Total lens length | 16.0000 |
| BF | 0.00000 |
| Entrance pupil position | 3.7453 |
| Exit pupil position | −13.9496 |
| Front-side principal point position | 4.8556 |
| Rear-side principal point position | 14.8171 |

TABLE 5

(Single lens data)

| Lens | Start surface | Focal distance |
|---|---|---|
| 1 | 1 | −9.9252 |
| 2 | 3 | −3.6246 |
| 3 | 5 | 10.3586 |
| 4 | 8 | 3.7142 |
| 5 | 10 | −2.8236 |
| 6 | 12 | 2.8017 |

(Second Numerical Example)

The fixed focal length lens system according to the second numerical example corresponds to the second exemplary embodiment shown in FIG. 3.

TABLE 6

(Surface data)

| Surface number | r | d | nd | vd | Effective diameter |
|---|---|---|---|---|---|
| Object surface | ∞ | | | | |
| 1 | 14.75500 | 0.80080 | 1.80420 | 46.5 | 8.001 |
| 2 | 6.01930 | 1.95300 | | | |
| 3* | 1.23520 | 0.80480 | 1.53345 | 55.6 | 3.689 |
| 4* | 0.57700 | 2.83160 | | | |
| 5* | −3.01000 | 1.30000 | 1.65521 | 21.1 | 1.550 |
| 6* | −2.43030 | 0.72540 | | | 4.914 |
| 7(diaphragm) | ∞ | 0.16350 | | | 0.916 |
| 8 | 8.55950 | 1.68990 | 1.61800 | 63.4 | |
| 9 | −3.00160 | 0.20600 | | | |
| 10* | −45.08580 | 0.70960 | 1.65521 | 21.1 | |
| 11* | 1.99660 | 0.00500 | 1.56732 | 42.8 | 5.559 |
| 12* | 1.99660 | 2.75300 | 1.53345 | 55.6 | 5.559 |
| 13* | −2.56440 | 1.33450 | | | 2.074 |
| 14 | ∞ | 0.70000 | 1.51680 | 64.2 | |
| 15 | ∞ | 0.12500 | | | |
| 16 | ∞ | BF | | | |
| Image surface | ∞ | | | | |

TABLE 7

(Aspherical data)

Third surface

K = −3.38512E+00, A4 = −8.56969E−03, A6 = 6.50484E−04,
A8 = −1.82788E−05 A10 = 2.37224E−07, A12 = 0.00000E+00,
A14 = 0.00000E+00
Fourth surface K = −1.62065E+00, A4 = −5.98907E−02, A6 = 2.04501E−01,
A8 = −1.67690E−01 A10 = 6.80561E−02, A12 = −1.38447E−02,
A14 = 1.13096E−03
Fifth surface K = −1.24462E+00, A4 = −2.03006E−02, A6 = −4.85181E−03,
A8 = 3.26609E−03 A10 = −3.76530E−04, A12 = −1.34352E−05,
A14 = 3.03800E−21
Sixth surface K = −2.04524E+00, A4 = −1.44863E−02, A6 = 1.58581E−03,
A8 = 4.29263E−04 A10 = −9.99592E−05, A12 = 2.89897E−06,
A14 = 3.03833E−21
Tenth surface K = 1.52248E+02, A4 = 1.15687E−02, A6 = −1.80186E−02,
A8 = 6.04657E−03 A10 = −6.90061E−04, A12 = −1.53566E−05,
A14 = 3.06297E−21
Eleventh surface K = −5.74019E−01, A4 = 1.23485E−01, A6 = −8.14068E−02,
A8 = 2.27592E−02 A10 = −2.62791E−03, A12 = 5.60507E−05,
A14 = 3.03185E−21
Twelfth surface K = −5.74019E−01, A4 = 1.23485E−01, A6 = −8.14068E−02,
A8 = 2.27592E−02 A10 = −2.62791E−03, A12 = 5.60507E−05,
A14 = 3.03185E−21
Thirteenth surface K = −9.86338E+00, A4 = −3.02532E−02, A6 = 7.30750E−03,
A8 = −1.01697E−03 A10 = 7.00083E−05, A12 = −4.38237E−10,
A14 = 0.00000E+00

TABLE 8

(Various pieces of data)

| | |
|---|---|
| Focal distance | 1.2315 |
| F number | 2.00075 |
| View angle | 107.0000 |
| Imaged height | 2.6875 |
| Total lens length | 16.1021 |
| BF | 0.00000 |
| Entrance pupil position | 4.4300 |
| Exit pupil position | −18.7158 |
| Front-side principal point position | 5.5806 |
| Rear-side principal point position | 14.9031 |

TABLE 9

(Single lens data)

| Lens | Start surface | Focal distance |
|---|---|---|
| 1 | 1 | −13.1808 |
| 2 | 3 | −3.5323 |
| 3 | 5 | 10.2025 |
| 4 | 8 | 3.8086 |
| 5 | 10 | −2.9007 |
| 6 | 12 | 2.6637 |

(Third Numerical Example)

The fixed focal length lens system according to the third numerical example corresponds to the third exemplary embodiment shown in FIG. 5.

TABLE 10

(Surface data)

| Surface number | r | d | nd | vd | Effective diameter |
|---|---|---|---|---|---|
| Object surface | ∞ | | | | |
| 1 | 14.21000 | 0.99920 | 1.80420 | 46.5 | 7.271 |
| 2 | 4.47260 | 2.18760 | | | |
| 3* | 3.91560 | 0.80470 | 1.53345 | 55.6 | 3.406 |
| 4* | 1.20580 | 2.47730 | | | |
| 5* | −2.87230 | 1.30000 | 1.65521 | 21.1 | 1.405 |
| 6* | −2.37400 | 0.73290 | | | 5.660 |
| 7(diaphragm) | ∞ | 0.04390 | | | 1.017 |
| 8 | 6.31670 | 2.22050 | 1.61800 | 63.4 | |
| 9 | −3.16880 | 0.23650 | | | |
| 10* | −24.61120 | 0.70660 | 1.65521 | 21.1 | |
| 11* | 2.03020 | 0.00500 | 1.56732 | 42.8 | 5.580 |
| 12* | 2.03020 | 2.77410 | 1.53345 | 55.6 | 5.580 |
| 13* | −3.09210 | 1.33200 | | | 2.070 |
| 14 | ∞ | 0.70000 | 1.51680 | 64.2 | |
| 15 | ∞ | 0.12500 | | | |
| 16 | ∞ | BF | | | |
| Image surface | ∞ | | | | |

TABLE 11

(Aspherical data)

Third surface

K = −2.51674E+00, A4 = −8.83375E−03, A6 = 6.49374E−04,
A8 = −1.54212E−05 A10 = 1.89715E−07, A12 = 0.00000E+00,
A14 = 0.00000E+00
Fourth surface K = −1.67908E+00, A4 = −1.40796E−03, A6 = 4.12485E−02,
A8 = −3.29642E−02 A10 = 1.31871E−02, A12 = −2.73514E−03,
A14 = 2.36932E−04
Fifth surface K = −1.21335E−01, A4 = −2.58259E−02, A6 = −1.99024E−03,
A8 = 2.60442E−03 A10 = −2.39229E−04, A12 = −1.34352E−05,
A14 = 3.55303E−23
Sixth surface K = −1.69983E+00, A4 = −1.67544E−02, A6 = 9.97799E−04,
A8 = 6.84074E−04 A10 = −1.28885E−04, A12 = 2.89854E−06,
A14 = 3.55456E−23
Tenth surface K = 1.37896E+02, A4 = 1.20646E−02, A6 = −1.82018E−02,
A8 = 5.98065E−03 A10 = −6.85563E−04, A12 = −1.53803E−05,
A14 = 3.55492E−23
Eleventh surface K = −5.40729E−01, A4 = 1.24227E−01, A6 = −8.09833E−02,
A8 = 2.28100E−02 A10 = −2.63911E−03, A12 = 5.60579E−05,
A14 = 3.55553E−23
Twelfth surface K = −5.40729E−01, A4 = 1.24227E−01, A6 = −8.09833E−02,
A8 = 2.28100E−02 A10 = −2.63911E−03, A12 = 5.60579E−05,
A14 = 3.55553E−23
Thirteenth surface K = −1.57934E+01, A4 = −2.98131E−02, A6 = 7.35249E−03,
A8 = −1.01434E−03 A10 = 6.29967E−05, A12 = 1.10828E−20,
A14 = 0.00000E+00

TABLE 12

(Various pieces of data)

| | |
|---|---|
| Focal distance | 1.2186 |
| F number | 1.99967 |

TABLE 12-continued (Various pieces of data)

| | |
|---|---|
| View angle | 107.0000 |
| Imaged height | 2.6320 |
| Total lens length | 16.6453 |
| BF | 0.00000 |
| Entrance pupil position | 3.8056 |
| Exit pupil position | −14.6769 |
| Front-side principal point position | 4.9232 |
| Rear-side principal point position | 15.4483 |

TABLE 13

(Single lens data)

| Lens | Start surface | Focal distance |
|---|---|---|
| 1 | 1 | −8.5051 |
| 2 | 3 | −3.6425 |
| 3 | 5 | 10.2745 |
| 4 | 8 | 3.7499 |
| 5 | 10 | −2.8327 |
| 6 | 12 | 2.8307 |

(Fourth Numerical Example)

The fixed focal length lens system according to the fourth numerical example corresponds to the fourth exemplary embodiment shown in FIG. 7.

TABLE 14

(Surface data)

| Surface number | r | d | nd | vd | Effective diameter |
|---|---|---|---|---|---|
| Object surface | ∞ | | | | |
| 1 | 14.42570 | 0.79310 | 1.77250 | 49.6 | 7.401 |
| 2 | 4.99800 | 2.04960 | | | |
| 3* | 2.77670 | 0.66540 | 1.53345 | 55.6 | 3.705 |
| 4* | 1.04170 | 2.75830 | | | |
| 5* | −3.06080 | 1.40000 | 1.65521 | 21.1 | 1.591 |
| 6* | −3.01250 | 1.07210 | | | 2.227 |
| 7(diaphragm) | ∞ | 0.12180 | | | 1.064 |
| 8 | 4.28130 | 2.20770 | 1.61800 | 63.4 | |
| 9 | −3.86760 | 0.25270 | | | |
| 10* | 846.47040 | 0.70000 | 1.65521 | 21.1 | 0.636 |
| 11* | 1.89620 | 0.00500 | 1.56732 | 42.8 | 5.607 |
| 12* | 1.89620 | 2.71190 | 1.53345 | 55.6 | 5.607 |
| 13* | −3.45270 | 1.35180 | | | 2.072 |
| 14 | ∞ | 0.70000 | 1.51680 | 64.2 | |
| 15 | ∞ | 0.12500 | | | |
| 16 | ∞ | BF | | | |
| Image surface | ∞ | | | | |

TABLE 15

(Aspherical data)

Third surface

K = −3.74811E+00, A4 = −8.53323E−03, A6 = 6.55234E−04,
A8 = −1.82103E−05 A10 = 2.10044E−07, A12 = 0.00000E+00,
A14 = 0.00000E+00
Fourth surface K = −1.42582E+00, A4 = 6.24694E−03, A6 = 1.18284E−02,
A8 = −8.10744E−03 A10 = 2.33760E−03, A12 = −3.45134E−04,
A14 = 2.30800E−05

TABLE 15-continued (Aspherical data)

Fifth surface

K = −1.61597E+00, A4 = −1.95256E−02, A6 = −8.41530E−04,
A8 = 1.32810E−03 A10 = −5.04871E−05, A12 = −1.34352E−05,
A14 = 3.55871E−23
Sixth surface K = −2.37539E+00, A4 = −1.28292E−02, A6 = 2.36218E−03,
A8 = −4.38786E−05 A10 = 1.48007E−05, A12 = 2.89897E−06,
A14 = 3.54880E−23
Tenth surface K = 1.72518E+05, A4 = 9.16918E−03, A6 = −1.86930E−02,
A8 = 5.85384E−03 A10 = −7.05353E−04, A12 = −1.53803E−05,
A14 = 3.53833E−23
Eleventh surface K = −5.69689E−01, A4 = 1.23804E−01, A6 = −8.14100E−02,
A8 = 2.27141E−02 A10 = −2.65199E−03, A12 = 5.60579E−05,
A14 = 3.68688E−23
Twelfth surface K = −5.69689E−01, A4 = 1.23804E−01, A6 = −8.14100E−02,
A8 = 2.27141E−02 A10 = −2.65199E−03, A12 = 5.60579E−05,
A14 = 3.68688E−23
Thirteenth surface K = −1.87833E+01, A4 = −3.04586E−02, A6 = 7.26711E−03,
A8 = −1.02491E−03 A10 = 6.84402E−05, A12 = 5.17760E−20,
A14 = 0.00000E+00

TABLE 16

(Various pieces of data)

| | |
|---|---|
| Focal distance | 1.2157 |
| F number | 1.99800 |
| View angle | 107.0000 |
| Imaged height | 2.6301 |
| Total lens length | 16.9144 |
| BF | 0.00000 |
| Entrance pupil position | 3.8380 |
| Exit pupil position | −12.5698 |
| Front-side principal point position | 4.9365 |
| Rear-side principal point position | 15.7366 |

TABLE 17

(Single lens data)

| Lens | Start surface | Focal distance |
|---|---|---|
| 1 | 1 | −10.2766 |
| 2 | 3 | −3.6063 |
| 3 | 5 | 23.3577 |
| 4 | 8 | 3.6675 |
| 5 | 10 | −2.9015 |
| 6 | 12 | 2.7858 |

(Fifth Numerical Example)

The fixed focal length lens system according to the fifth numerical example corresponds to the fifth exemplary embodiment shown in FIG. 9.

TABLE 18

(Surface data)

| Surface number | r | d | nd | vd | Effective diameter |
|---|---|---|---|---|---|
| Object surface | ∞ | | | | |
| 1 | 14.95760 | 0.82730 | 1.80420 | 46.5 | 7.601 |
| 2 | 4.77670 | 2.25240 | | | |
| 3* | 2.65370 | 0.75000 | 1.53345 | 55.6 | 3.354 |
| 4* | 1.02660 | 2.59820 | | | |
| 5* | −3.18440 | 1.49380 | 1.65521 | 21.1 | 1.544 |
| 6* | −3.06330 | 1.18560 | | | 2.832 |
| 7(diaphragm) | ∞ | 0.01450 | | | 1.080 |
| 8 | 5.29340 | 2.30090 | 1.61800 | 63.4 | |
| 9 | −6.99560 | 0.62310 | | | |
| 10* | 6.85710 | 0.70000 | 1.65521 | 21.1 | 1.994 |
| 11* | 1.93050 | 0.00500 | 1.56732 | 42.8 | |
| 12* | 1.93050 | 3.24410 | 1.53345 | 55.6 | |
| 13* | −3.21920 | 1.28550 | | | 2.241 |
| 14 | ∞ | 0.70000 | 1.51680 | 64.2 | |
| 15 | ∞ | 0.12500 | | | |
| 16 | ∞ | BF | | | |
| Image surface | ∞ | | | | |

TABLE 19

(Aspherical data)

Third surface

K = −1.13817E+00, A4 = −1.38251E−02, A6 = 8.35655E−04, A8 = −1.64418E−05 A10 = 1.61692E−07, A12 = 0.00000E+00, A14 = 0.00000E+00

Fourth surface

K = −1.27524E+00, A4 = −2.02414E−02, A6 = 7.02675E−02, A8 = −5.49989E−02 A10 = 2.39054E−02, A12 = −5.44436E−03, A14 = 5.23756E−04

Fifth surface

K = −2.98194E+00, A4 = −1.81136E−02, A6 = −9.49868E−04, A8 = −1.55080E−05 A10 = 5.30139E−05, A12 = −1.34352E−05, A14 = 3.55056E−23

Sixth surface

K = −2.75153E+00, A4 = −1.35159E−02, A6 = 5.43866E−04, A8 = −3.53288E−05 A10 = −1.47957E−05, A12 = 2.89897E−06, A14 = 3.55056E−23

Tenth surface

K = −1.72390E+01, A4 = 1.27353E−02, A6 = −6.94733E−03, A8 = 1.06741E−03 A10 = 4.82740E−06, A12 = −1.53803E−05, A14 = 3.55056E−23

Eleventh surface

K = −6.93473E−01, A4 = 9.26573E−02, A6 = −4.05916E−02, A8 = 9.16466E−03 A10 = −1.11964E−03, A12 = 5.60579E−05, A14 = 3.55056E−23

Twelfth surface

K = −6.93473E−01, A4 = 9.26573E−02, A6 = −4.05916E−02, A8 = 9.16466E−03 A10 = −1.11964E−03, A12 = 5.60579E−05, A14 = 3.55056E−23

Thirteenth surface

K = −1.48359E+01, A4 = −2.52035E−02, A6 = 5.93332E−03, A8 = −8.67831E−04 A10 = 5.44250E−05, A12 = 1.31078E−20, A14 = 0.00000E+00

TABLE 20

(Various pieces of data)

| | |
|---|---|
| Focal distance | 1.2194 |
| F number | 2.00011 |

TABLE 20-continued (Various pieces of data)

| | |
|---|---|
| View angle | 107.0000 |
| Imaged height | 2.6310 |
| Total lens length | 18.1054 |
| BF | 0.00000 |
| Entrance pupil position | 3.8710 |
| Exit pupil position | −26.9210 |
| Front-side principal point position | 5.0352 |
| Rear-side principal point position | 16.8982 |

TABLE 21

(Single lens data)

| Lens | Start surface | Focal distance |
|---|---|---|
| 1 | 1 | −9.0545 |
| 2 | 3 | −3.7381 |
| 3 | 5 | 20.8977 |
| 4 | 8 | 5.2515 |
| 5 | 10 | −4.3453 |
| 6 | 12 | 2.8972 |

(Sixth Numerical Example)

The fixed focal length lens system according to the sixth numerical example corresponds to the sixth exemplary embodiment shown in FIG. 11.

TABLE 22

(Surface data)

| Surface number | r | d | nd | vd | Effective diameter |
|---|---|---|---|---|---|
| Object surface | ∞ | | | | |
| 1 | 14.99940 | 0.80000 | 1.80420 | 46.5 | 7.604 |
| 2 | 4.73720 | 2.28010 | | | |
| 3* | 2.63180 | 0.75000 | 1.53345 | 55.6 | 3.515 |
| 4* | 1.00490 | 3.01010 | | | 2.227 |
| 5* | −3.54580 | 1.40000 | 1.65521 | 21.1 | 1.583 |
| 6* | −3.43750 | 1.37260 | | | 2.645 |
| 7(diaphragm) | ∞ | 0.15360 | | | 1.144 |
| 8 | 3.72950 | 1.64080 | 1.61800 | 63.4 | |
| 9 | −92301.49890 | 1.14880 | | | |
| 10* | 4.93500 | 0.70000 | 1.65521 | 21.1 | 1.810 |
| 11* | 2.03970 | 0.00500 | 1.56732 | 42.8 | |
| 12* | 2.03970 | 3.55350 | 1.53345 | 55.6 | |
| 13* | −3.39540 | 1.20730 | | | 2.404 |
| 14 | ∞ | 0.70000 | 1.51680 | 64.2 | |
| 15 | ∞ | 0.12500 | | | |
| 16 | ∞ | BF | | | |
| Image surface | ∞ | | | | |

TABLE 23

(Aspherical data)

Third surface

K = −1.85471E+00, A4 = −1.06367E−02, A6 = 7.68451E−04, A8 = −2.65164E−05 A10 = 4.22393E−07, A12 = 0.00000E+00, A14 = 0.00000E+00

Fourth surface

K = −3.81870E+00, A4 = 2.06036E−01, A6 = −1.14648E−01, A8 = 4.90818E−02 A10 = −1.33540E−02, A12 = 2.05497E−03, A14 = −1.32344E−04

TABLE 23-continued (Aspherical data)

Fifth surface

K = −3.62833E+00, A4 = −1.47225E−02, A6 = −4.54536E−05,
A8 = −8.46881E−04 A10 = 1.82365E−04, A12 = −1.34352E−05,
A14 = −9.94607E−22
Sixth surface K = −3.59432E+00, A4 = −1.36942E−02, A6 = 1.55584E−04,
A8 = −2.70004E−05 A10 = −7.71713E−06, A12 = 2.89897E−06,
A14 = −1.80901E−18
Tenth surface K = −3.16112E+00, A4 = 8.74495E−03, A6 = −7.91915E−03,
A8 = 1.15517E−03 A10 = −2.43705E−05, A12 = −1.53803E−05,
A14 = 7.04803E−19
Eleventh surface K = −7.47187E−01, A4 = 1.18585E−01, A6 = −5.01239E−02,
A8 = 1.03762E−02 A10 = −1.17897E−03, A12 = 5.60579E−05,
A14 = 8.42122E−20
Twelfth surface K = −7.47187E−01, A4 = 1.18585E−01, A6 = −5.01239E−02,
A8 = 1.03762E−02 A10 = −1.17897E−03, A12 = 5.60579E−05,
A14 = 8.42122E−20
Thirteenth surface K = −2.19879E+01, A4 = −3.25417E−02, A6 = 6.69421E−03,
A8 = −9.21385E−04 A10 = 5.22206E−05, A12 = 1.63702E16,
A14 = 0.00000E+00

TABLE 24

(Various pieces of data)

| | |
|---|---|
| Focal distance | 1.2179 |
| F number | 2.00104 |
| View angle | 85.0000 |
| Imaged height | 2.1092 |
| Total lens length | 18.8468 |
| BF | 0.00000 |
| Entrance pupil position | 3.8796 |
| Exit pupil position | −37.5028 |
| Front-side principal point position | 5.0579 |
| Rear-side principal point position | 17.6498 |

TABLE 25

(Single lens data)

| Lens | Start surface | Focal distance |
|---|---|---|
| 1 | 1 | −8.9197 |
| 2 | 3 | −3.6294 |
| 3 | 5 | 28.0799 |
| 4 | 8 | 6.0346 |
| 5 | 10 | −5.8677 |
| 6 | 12 | 3.0919 |

(Seventh Numerical Example)

The fixed focal length lens system according to the seventh numerical example corresponds to the seventh exemplary embodiment shown in FIG. 13.

TABLE 26

(Surface data)

| Surface number | r | d | nd | vd | Effective diameter |
|---|---|---|---|---|---|
| Object surface | ∞ | | | | |
| 1 | 13.13320 | 0.80000 | 1.80420 | 46.5 | 7.201 |
| 2 | 4.93460 | 2.13620 | | | |
| 3* | 3.03810 | 0.70000 | 1.58913 | 61.3 | 3.517 |
| 4* | 1.11790 | 2.59370 | | | |
| 5* | −3.19010 | 1.49710 | 1.68893 | 31.1 | 1.605 |
| 6* | −2.44560 | 0.89710 | | | 2.549 |
| 7(diaphragm) | ∞ | 0.33050 | | | 0.998 |
| 8 | 7.79100 | 1.82550 | 1.61800 | 63.4 | |
| 9 | −3.27050 | 0.20440 | | | |
| 10* | −38.20810 | 0.70000 | 1.68893 | 31.1 | |
| 11* | 1.86030 | 0.00500 | 1.56732 | 42.8 | 5.615 |
| 12* | 1.86030 | 2.73240 | 1.56873 | 63.2 | 5.615 |
| 13* | −3.35970 | 1.36850 | | | 2.074 |
| 14 | ∞ | 0.70000 | 1.51680 | 64.2 | |
| 15 | ∞ | 0.12500 | | | |
| 16 | ∞ | BF | | | |
| Image surface | ∞ | | | | |

TABLE 27

(Aspherical data)

Third surface

K = −3.42220E+00, A4 = −8.70260E−03, A6 = 6.50032E−04,
A8 = −1.82231E−05 A10 = 2.13793E−07, A12 = 0.00000E+00,
A14 = 0.00000E+00
Fourth surface K = −1.48197E+00, A4 = 1.04214E−02, A6 = 9.28244E−03,
A8 = −6.82764E−03 A10 = 1.86458E−03, A12 = −2.37484E−04,
A14 = 1.25574E−05
Fifth surface K = −8.94273E−01, A4 = −2.20233E−02, A6 = −3.70028E−03,
A8 = 1.36952E−03 A10 = 2.79431E−05, A12 = −1.34352E−05,
A14 = 3.55677E−23
Sixth surface K = −1.97883E+00, A4 = −1.48007E−02, A6 = 1.02666E−03,
A8 = −4.69596E−06 A10 = 8.27187E−07, A12 = 2.89897E−06,
A14 = 3.55677E−23
Tenth surface K = −2.52570E+02, A4 = 1.21020E−02, A6 = −1.81396E−02,
A8 = 5.99112E−03 A10 = −6.96286E−04, A12 = −1.53803E−05,
A14 = 3.55677E−23
Eleventh surface K = −5.70606E−01, A4 = 1.24132E−01, A6 = −8.12986E−02,
A8 = 2.27015E−02 A10 = −2.66692E−03, A12 = 5.60579E−05,
A14 = 3.55677E−23
Twelfth surface K = −5.70606E−01, A4 = 1.24132E−01, A6 = −8.12986E−02,
A8 = 2.27015E−02 A10 = −2.66692E−03, A12 = 5.60579E−05,
A14 = 3.55677E−23
Thirteenth surface K = −1.68770E+01, A4 = −2.92075E−02, A6 = 7.37949E−03,
A8 = −1.02103E−03 A10 = 6.71278E−05, A12 = 1.31685E−20,
A14 = 0.00000E+00

TABLE 28

(Various pieces of data)

| | |
|---|---|
| Focal distance | 1.2175 |
| F number | 2.00282 |
| View angle | 107.0000 |
| Imaged height | 2.6340 |
| Total lens length | 16.6154 |
| BF | 0.00000 |
| Entrance pupil position | 3.8539 |
| Exit pupil position | −13.8212 |
| Front-side principal point position | 4.9644 |
| Rear-side principal point position | 15.4335 |

TABLE 29

(Single lens data)

| Lens | Start surface | Focal distance |
|---|---|---|
| 1 | 1 | −10.2762 |
| 2 | 3 | −3.4714 |
| 3 | 5 | 8.3563 |
| 4 | 8 | 3.9782 |
| 5 | 10 | −2.5567 |
| 6 | 12 | 2.5984 |

(Eighth Numerical Example)

The fixed focal length lens system according to the eighth numerical example corresponds to the eighth exemplary embodiment shown in FIG. 15.

TABLE 30

(Surface data)

| Surface number | r | d | nd | vd | Effective diameter |
|---|---|---|---|---|---|
| Object surface | ∞ | | | | |
| 1 | 12.74210 | 0.78730 | 1.80420 | 46.5 | 7.193 |
| 2 | 4.89140 | 2.83110 | | | |
| 3* | 4.77600 | 0.75280 | 1.53345 | 55.6 | 5.420 |
| 4* | 1.00900 | 1.85630 | | | 1.765 |
| 5* | 6.75390 | 2.53160 | 1.63970 | 23.5 | 1.861 |
| 6* | −4.59790 | 0.06300 | | | |
| 7(diaphragm) | ∞ | 0.65090 | | | 0.900 |
| 8* | 4.32780 | 0.99990 | 1.63970 | 23.5 | 1.092 |
| 9* | 0.95680 | 0.00500 | 1.56732 | 42.8 | 1.982 |
| 10* | 0.95680 | 1.94890 | 1.53345 | 55.6 | 1.982 |
| 11* | −8.83330 | 0.10010 | | | 1.759 |
| 12* | 3.44770 | 1.76190 | 1.55332 | 71.7 | 3.115 |
| 13* | −7.98430 | 1.37610 | | | 2.400 |
| 14 | ∞ | 0.75000 | 1.51680 | 64.2 | |
| 15 | ∞ | 0.12500 | | | |
| 16 | ∞ | BF | | | |
| Image surface | ∞ | | | | |

TABLE 31

(Aspherical data)

Third surface

K = 0.00000E+00, A4 = −1.55922E−02, A6 = 1.00313E−03, A8 = −4.03468E−05 A10 = 6.46346E−07, A12 = 0.00000E+00, A14 = 0.00000E+00, A16 = 0.00000E+00

Fourth surface

K = −9.44427E−01, A4 = 6.79046E−03, A6 = −3.10156E−03, A8 = 1.08518E−03 A10 = −3.02745E−04, A12 = −1.23572E−05, A14 = 7.33385E−06, A16 = −8.38726E−07

TABLE 31-continued (Aspherical data)

Fifth surface

K = 5.87620E+00, A4 = 5.22192E−04, A6 = 5.42377E−04, A8 = −7.20133E−04 A10 = 0.00000E+00, A12 = 0.00000E+00, A14 = 0.00000E+00, A16 = 0.00000E+00

Sixth surface

K = −2.59555E+01, A4 = −2.60863E−02, A6 = 9.89917E−03, A8 = −2.75212E−03 A10 = 0.00000E+00, A12 = 0.00000E+00, A14 = 0.00000E+00, A16 = 0.00000E+00

Eighth surface

K = 0.00000E+00, A4 = −5.52288E−04, A6 = −7.33688E−03, A8 = 4.07958E−03 A10 = −5.80093E−04, A12 = −4.32440E−05, A14 = −2.11347E−05, A16 = 3.54291E−06

Ninth surface

K = −7.75978E−01, A4 = −6.72479E−02, A6 = −6.11910E−03, A8 = −2.84389E−05 A10 = −3.69123E−04, A12 = 8.41616E−05, A14 = 2.30042E−05, A16 = −1.57856E−05

Tenth surface

K = −7.75978E−01, A4 = −6.72479E−02, A6 = −6.11910E−03, A8 = −2.84389E−05 A10 = −3.69123E−04, A12 = 8.41616E−05, A14 = 2.30042E−05, A16 = −1.57856E−05

Eleventh surface

K = 1.53266E+01, A4 = −3.30511E−03, A6 = −5.78117E−03, A8 = 5.84613E−03 A10 = −1.43920E−03, A12 = −1.76028E−05, A14 = 9.24499E−05, A16 = −1.37651E−05

Twelfth surface

K = −4.95214E−01, A4 = −1.22270E−02, A6 = 4.19113E−04, A8 = 2.32737E−04 A10 = −2.06449E−05, A12 = 1.43455E−09, A14 = 0.00000E+00, A16 = 0.00000E+00

Thirteenth surface

K = 7.31804E+00, A4 = 1.71140E−02, A6 = −4.95215E−03, A8 = 6.19075E−04 A10 = −9.34095E−06, A12 = −1.84779E−09, A14 = 0.00000E+00, A16 = 0.00000E+00

TABLE 32

(Various pieces of data)

| | |
|---|---|
| Focal distance | 1.2366 |
| F number | 2.05928 |
| View angle | 107.0000 |
| Imaged height | 2.6372 |
| Total lens length | 16.5399 |
| BF | 0.00000 |
| Entrance pupil position | 3.9812 |
| Exit pupil position | −14.6536 |
| Front-side principal point position | 5.1134 |
| Rear-side principal point position | 15.2998 |

TABLE 33

(Single lens data)

| Lens | Start surface | Focal distance |
|---|---|---|
| 1 | 1 | −10.3339 |
| 2 | 3 | −2.5773 |
| 3 | 5 | 4.6838 |
| 4 | 8 | −2.1715 |
| 5 | 10 | 1.7387 |
| 6 | 12 | 4.6046 |

(Ninth Numerical Example)

The fixed focal length lens system according to the ninth numerical example corresponds to the ninth exemplary embodiment shown in FIG. 17.

TABLE 34

(Surface data)

| Surface number | r | d | nd | vd | Effective diameter |
|---|---|---|---|---|---|
| Object surface | ∞ | | | | |
| 1 | 13.25130 | 0.80000 | 1.83481 | 42.7 | 7.201 |
| 2 | 5.22020 | 2.76940 | | | |
| 3* | 4.85000 | 0.75000 | 1.53345 | 55.6 | 8.785 |
| 4* | 1.01090 | 1.90910 | | | 2.089 |
| 5* | 4.90360 | 2.67070 | 1.63970 | 23.5 | |
| 6* | −14.26890 | 0.51570 | | | 1.515 |
| 7(diaphragm) | ∞ | 0.23350 | | | 0.826 |
| 8* | 3.42740 | 1.50000 | 1.82115 | 24.1 | 0.861 |
| 9* | 1.12080 | 0.00500 | 1.56732 | 42.8 | 1.818 |
| 10* | 1.12080 | 1.77410 | 1.61881 | 63.9 | 1.818 |
| 11* | −3.69120 | 0.10000 | | | 1.598 |
| 12* | 3.44240 | 1.50510 | 1.55332 | 71.7 | 4.279 |
| 13* | 184.16160 | 1.05830 | | | 2.486 |
| 14 | ∞ | 0.75000 | 1.51680 | 64.2 | |
| 15 | ∞ | 0.12500 | | | |
| 16 | ∞ | BF | | | |
| Image surface | ∞ | | | | |

TABLE 35

(Aspherical data)
Aspherical data

Third surface

K = 0.00000E+00, A4 = −1.38021E−02, A6 = 7.16311E−04,
A8 = −2.14591E−05 A10 = 1.62117E−07, A12 = 0.00000E+00,
A14 = 0.00000E+00, A16 = 0.00000E+00

Fourth surface

K = −1.01671E+00, A4 = 3.43210E−03, A6 = −3.28121E−03,
A8 = 1.33902E−06 A10 = 4.69957E−05, A12 = −1.23572E−05,
A14 = 7.33385E−06, A16 = −8.38726E−07

Fifth surface

K = −1.69807E+01, A4 = 1.95728E−02, A6 = −3.13949E−03,
A8 = 3.28661E−04 A10 = 0.00000E+00, A12 = 0.00000E+00,
A14 = 0.00000E+00, A16 = 0.00000E+00

Sixth surface

K = 0.00000E+00, A4 = −7.65546E−03, A6 = 9.74388E−03,
A8 = −5.39896E−03 A10 = 1.27479E−03, A12 = −1.08204E−16,
A14 = 0.00000E+00, A16 = 0.00000E+00

Eighth surface

K = 0.00000E+00, A4 = −4.46275E−03, A6 = −1.37673E−02,
A8 = 1.39554E−02 A10 = −4.57916E−03, A12 = −4.32440E−05,
A14 = −2.11347E−05, A16 = 3.54291E−06

Ninth surface

K = −6.34491E−01, A4 = −6.29874E−02, A6 = 5.84771E−03,
A8 = −5.63145E−03 A10 = 2.93396E−04, A12 = 8.41616E−05,
A14 = 2.30042E−05, A16 = −1.57856E−05

Tenth surface

K = −6.34491E−01, A4 = −6.29874E−02, A6 = 5.84771E−03,
A8 = −5.63145E−03 A10 = 2.93396E−04, A12 = 8.41616E−05,
A14 = 2.30042E−05, A16 = −1.57856E−05

TABLE 35-continued (Aspherical data)
Aspherical data

Eleventh surface

K = 0.00000E+00, A4 = 4.44012E−04, A6 = −3.14884E−03,
A8 = 3.95695E−03 A10 = −1.09932E−03, A12 = −2.32146E−05,
A14 = 9.24499E−05, A16 = −1.37651E−05

Twelfth surface

K = −5.59604E−01, A4 = −5.67007E−03, A6 = −4.22660E−04,
A8 = 2.45212E−04 A10 = −2.37156E−05, A12 = 6.19500E−07,
A14 = 0.00000E+00, A16 = 0.00000E+00

Thirteenth surface

K = 0.00000E+00, A4 = 1.50272E−02, A6 = −6.92155E−03,
A8 = 1.01281E−03 A10 = −4.67558E−05, A12 = −2.01180E−07,
A14 = 0.00000E+00, A16 = 0.00000E+00

TABLE 36

(Various pieces of data)

| Focal distance | 1.1577 |
|---|---|
| F number | 2.06034 |
| View angle | 107.0000 |
| Imaged height | 2.6299 |
| Total lens length | 16.4659 |
| BF | 0.00000 |
| Entrance pupil position | 4.0799 |
| Exit pupil position | −8.6818 |
| Front-side principal point position | 5.0842 |
| Rear-side principal point position | 15.3682 |

TABLE 37

(Single lens data)

| Lens | Start surface | Focal distance |
|---|---|---|
| 1 | 1 | −10.8075 |
| 2 | 3 | −2.5686 |
| 3 | 5 | 6.0327 |
| 4 | 8 | −2.8696 |
| 5 | 10 | 1.6173 |
| 6 | 12 | 6.3211 |

(Values Corresponding to Conditions)

The following table shows various values corresponding to the numerical examples.

TABLE 1

|  | Condition (1) | Condition (2) | Condition (3) | Condition (4) | Condition (5) | Condition (6) |
| --- | --- | --- | --- | --- | --- | --- |
| Numerical Example 1 | 3.00 | 7.39 | −1.25 | 10.14 | 0.87 | 55.65 |
| Numerical Example 2 | 1.52 | 7.84 | −1.14 | 9.38 | 0.92 | 55.65 |
| Numerical Example 3 | 15.06 | 7.89 | −1.30 | 10.53 | 0.85 | 55.65 |
| Numerical Example 4 | 3.50 | 16.65 | −0.99 | 125.59 | 1.00 | 55.65 |
| Numerical Example 5 | 3.50 | 17.48 | 0.01 | 80.85 | 1.80 | 55.65 |
| Numerical Example 6 | 3.50 | 20.02 | 1.00 | 64.50 | 2.41 | 55.65 |
| Numerical Example 7 | 4.20 | 5.59 | −1.19 | 7.57 | 0.91 | 63.10 |
| Numerical Example 8 | 83.79 | 1.85 | ∞ | 0.19 | −0.80 | 71.68 |
| Numerical Example 9 | 27.20 | 2.26 | ∞ | −0.49 | −0.53 | 71.68 |

The exemplary embodiments have been described as examples of the technique in the present disclosure. For that purpose, the accompanying drawings and detailed descriptions have been provided.

Accordingly, the constituent elements described in the accompanying drawings and the detailed description may include not only the constituent elements essential for solving the problem but also constituent elements that are not essential for solving the problem in order to illustrate the technique. It should not be therefore determined that the unessential constituent elements in the accompanying drawings and the detailed description are essential only based on the fact that these constituent elements are included in the drawings and the description.

The above exemplary embodiments are provided to exemplify the technique according to the present disclosure, and various changes, replacements, additions, omissions, and the like can be made within the scope of the claims and equivalents thereof.

INDUSTRIAL APPLICABILITY

The present disclosure can be applied to fixed focal length lens systems for use in devices such as on-vehicle cameras, surveillance cameras, and web cameras. In particular, the present disclosure is beneficial for a fixed focal length lens system used in a camera such as an on-vehicle camera that is required to provide improved picture quality.

REFERENCE MARKS IN THE DRAWINGS

L1 first lens element
L2 second lens element
L3 third lens element
L4 fourth lens element
L5 fifth lens element
L6 sixth lens element
CG parallel plate
A aperture diaphragm
S image plane
100 on-vehicle camera
201 fixed focal length lens system
202 imaging device
401 display device
402 display device
500 vehicle

The invention claimed is:

1. A fixed focal length lens system comprising, in order from an object side to an image side:
a first lens element having negative power;
a second lens element having negative power;
a third lens element having positive power;
a fourth lens element having power;
a fifth lens element having power; and
a sixth lens element having positive power,
wherein:
the third lens element is a positive meniscus lens element;
on the object side, the third lens element has a concave surface extending across an optical axis of the fixed focal length lens system and protruding towards to the image side;
on the image side, the third lens element has a convex surface extending across the optical axis of the fixed focal length lens system and protruding towards to the image side;
at least one of the second lens element, the third lens element, the fourth lens element, the fifth lens element or the sixth lens element is made of glass;
the fixed focal length lens system satisfies:

$$1.5 < (L1R2 + L2R1)/(L1R2 - L2R1) < 30.0$$

where
L1R2 is a radius of curvature of an image-side surface of the first lens element, and
L2R1 is a radius of curvature of an object-side surface of the second lens element;
the fixed focal length lens system further satisfies:

$$6.7 < f3/L3th < 30$$

where
f3 is a focal distance of the third lens element, and
L3th is a thickness of the third lens element in an optical axis direction; and
the fixed focal length lens system additionally satisfies:

$$0.78 < (L5R1 + L5R2)/(L5R1 - L5R2) < 2.5$$

where
L5R1 is a radius of curvature of an object-side surface of the fifth lens element, and
L5R2 is a radius of curvature of an image-side surface of the fifth lens element.

2. The fixed focal length lens system according to claim 1, wherein the fixed focal length lens system satisfies:

$$-1.8 < (L4R2 + L5R1)/(L4R2 - L5R1) < 5.9$$

where
L4R2 is a radius of curvature of an image-side surface of the fourth lens element, and
L5R1 is a radius of curvature of an object-side surface of the fifth lens element.

3. The fixed focal length lens system according to claim 1, wherein the fixed focal length lens system satisfies:

$$8.8 < (L3R1 + L3R2)/(L3R1 - L3R2) < 130$$

where
L3R1 is a radius of curvature of the concave surface of the third lens element, and L3R2 is a radius of curvature of the convex surface of the third lens element.

4. The fixed focal length lens system according to claim 1, wherein the fixed focal length lens system satisfies:

$$0.78<(L5R1+L5R2)/(L5R1-L5R2)<2.5$$

where
L5R1 is a radius of curvature of an object-side surface of the fifth lens element, and
L5R2 is a radius of curvature of an image-side surface of the fifth lens element.

5. The fixed focal length lens system according to claim 1, wherein the fixed focal length lens system satisfies:

$$vL6>45$$

where vL6 is an Abbe number of the sixth lens element.

6. The fixed focal length lens system according to claim 2, wherein the fixed focal length lens system satisfies:

$$8.8<(L3R1+L3R2)/(L3R1-L3R2)<130$$

where
L3R1 is a radius of curvature of the concave surface of the third lens element, and
L3R2 is a radius of curvature of the convex surface of the third lens element.

7. The fixed focal length lens system according to claim 2, wherein the fixed focal length lens system satisfies:

$$vL6>45$$

where vL6 is an Abbe number of the sixth lens element.

8. A camera comprising:
a fixed focal length lens system; and
an imaging device configured to image light converged by the fixed focal length lens system,
wherein the fixed focal length lens system includes, in order from an object side to an image side:
a first lens element having negative power;
a second lens element having negative power;
a third lens element having positive power;
a fourth lens element having power;
a fifth lens element having power; and
a sixth lens element having positive power;
wherein:
the third lens element is a positive meniscus lens element;
on the object side, the third lens element has a concave surface extending across an optical axis of the fixed focal length lens system and protruding towards to the image side;
on the image side, the third lens element has a convex surface extending across the optical axis of the fixed focal length lens system and protruding towards to the image side;
at least one of the second lens element, the third lens element, the fourth lens element, the fifth lens element or the sixth lens element is made of glass;
the fixed focal length lens system satisfies:

$$1.5<(L1R2+L2R1)/(L1R2-L2R1)<30$$

where
L1R2 is a radius of curvature of an image-side surface of the first lens element, and
L2R1 is a radius of curvature of an object-side surface of the second lens element;
the fixed focal length lens system further satisfies:

$$6.7<f3/L3th<30$$

where
f3 is a focal distance of the third lens element, and
L3th is a thickness of the third lens element in an optical axis direction; and
the fixed focal length lens system additionally satisfies:

$$0.78<(L5R1+L5R2)/(L5R1-L5R2)<2.5$$

where
L5R1 is a radius of curvature of an object-side surface of the fifth lens element, and
L5R2 is a radius of curvature of an image-side surface of the fifth lens element.

9. The camera according to claim 8, wherein the fixed focal length lens system satisfies:

$$-1.8<(L4R2+L5R1)/(L4R2-L5R1)<5.9$$

where
L4R2 is a radius of curvature of an image-side surface of the fourth lens element, and
L5R1 is a radius of curvature of an object-side surface of the fifth lens element.

* * * * *